US011944976B2

(12) United States Patent
Knecht et al.

(10) Patent No.: US 11,944,976 B2
(45) Date of Patent: Apr. 2, 2024

(54) VERTICAL BALL MILL, STATOR SEGMENT FOR A VERTICAL BALL MILL AND METHOD FOR MAINTAINING A VERTICAL BALL MILL

(71) Applicant: VERTICAL POWER MILLS TECHNOLOGY AG, Baden (CH)

(72) Inventors: Johann Knecht, Wadersloh (DE); Norbert Patzelt, Beckum (DE)

(73) Assignee: Vertical Power Mills Technology AG, Baden (CH)

( * ) Notice: Subject to any disclaimer, the term of this patent is extended or adjusted under 35 U.S.C. 154(b) by 548 days.

(21) Appl. No.: 17/275,472

(22) PCT Filed: Sep. 13, 2019

(86) PCT No.: PCT/EP2019/074550
§ 371 (c)(1),
(2) Date: Mar. 11, 2021

(87) PCT Pub. No.: WO2020/053419
PCT Pub. Date: Mar. 19, 2020

(65) Prior Publication Data

US 2022/0118459 A1 Apr. 21, 2022

(30) Foreign Application Priority Data

Sep. 14, 2018 (DE) ..................... 10 2018 122 540.7

(51) Int. Cl.
*B02C 17/16* (2006.01)
*B02C 17/00* (2006.01)
(Continued)

(52) U.S. Cl.
CPC ............ *B02C 17/16* (2013.01); *B02C 17/002* (2013.01)

(58) Field of Classification Search
CPC ..... B02C 17/16; B02C 17/0002; B02C 17/04; B02C 17/10; B02C 17/163; B02C 17/18; B02C 17/181
See application file for complete search history.

(56) References Cited

U.S. PATENT DOCUMENTS 3,640,476 A 2/1972 Engels
5,193,754 A * 3/1993 Pujol ..................... B02C 17/166 241/179
(Continued)

FOREIGN PATENT DOCUMENTS

CN 101610849 B 7/2012
DE 1 901 593 A1 8/1971
(Continued)

OTHER PUBLICATIONS

English translate (DE10110652B4), retrieved date Sep. 4, 2023.*
(Continued)

*Primary Examiner* — Matthew Katcoff
*Assistant Examiner* — Mohammed S. Alawadi
(74) *Attorney, Agent, or Firm* — THE MARBURY LAW GROUP, PLLC

(57) ABSTRACT

A vertical ball mill includes: a rotor, which is axially and radially supported at an upper end; a stator, which radially extends around the rotor, stands in a self-supporting manner and has a lateral surface that is oriented tangentially to the rotor; and a base plate supporting the weight of the stator. The stator includes least two stator segments, which may be separated from one another, stand unsupported in the separated state and may be moved relative to one another; wherein each of the stator segments has, on at least one side edge of a wall which forms the lateral surface, a sealing surface for sealing to the other stator segment, and has, on the bottom edge, a standing surface for sealing to the base
(Continued)

plate; wherein the stator segment standing surface weighs on a load-bearing surface of the base plate.

19 Claims, 11 Drawing Sheets

(51) Int. Cl.
*B02C 17/18* (2006.01)
*B02C 17/22* (2006.01)

(56) References Cited

U.S. PATENT DOCUMENTS

| | | | | |
|---|---|---|---|---|
| 5,312,055 | A | 5/1994 | Barthelmess et al. | |
| 5,971,307 | A | 10/1999 | Davenport | |
| 8,129,881 | B2 | 3/2012 | Hösle | |
| 2019/0358638 | A1 * | 11/2019 | Belke | B02C 17/22 |

FOREIGN PATENT DOCUMENTS

| | | | | |
|---|---|---|---|---|
| DE | 10110652 | B4 * | 1/2004 | B02C 17/161 |
| EP | 0 529 434 | B1 | 3/1993 | |
| IT | B020 090 605 | A1 | 3/2011 | |
| RU | 17112 | U1 | 3/2001 | |
| RU | 2452578 | C2 | 7/2014 | |
| RU | 2522529 | C2 | 7/2014 | |
| RU | 2524369 | C1 | 7/2014 | |
| SU | 1151302 | A1 | 4/1985 | |
| WO | 2007/019602 | A2 | 2/2007 | |
| WO | 2018/138405 | A1 | 8/2018 | |

OTHER PUBLICATIONS

Decision on Grant of a Patent for Invention in related Application No. 2021106516/10(014083) filed Sep. 13, 2019.
Vertimill, “The most mature stirred milling technology”, Accessories for Vertimill®, 8 pages.
Roitto, et al., “Stirred Milling Technology—A New Concept in Fine Grinding”, pp. 190-201, Metallurgical Plant Design and Operating Strategies (MetPlant), Perth WA, Jul. 15-17, 2013.
Lehto, et al., “Outotec HIGmills; A Fine Grinding Technology”, 23rd international Mining Congress & Exhibition of Turkey, Antayla, 8 pages, Apr. 16-19, 2013.
Outotec, “Outotech Higmill® High Intensity Grinding Mill”, 13 pages.
Metso:Outotec, “The Metso Outotec® HIGmill® is an advanced and entergy-efficient fine and ultra-fine grinding solution that relies on proven technology”, http://www.outotec.com/products/grinding/higmill-high-intensity-grinding-mill/, 18 pages.
International Search Report received from the European Patent Office in PCT International Application No. PCT/EP2019/074550 dated Nov. 28, 2019.

* cited by examiner

VERTICAL BALL MILL, STATOR SEGMENT FOR A VERTICAL BALL MILL AND METHOD FOR MAINTAINING A VERTICAL BALL MILL

CROSS-REFERENCE TO RELATED APPLICATIONS

This is a national stage application of PCT/EP2019/074550, filed internationally on Sep. 13, 2019, which claims priority to German Application No. 10 2018 122 540.7, filed on Sep. 14, 2018, both of which are incorporated by reference herein by their entireties.

FIELD

The invention relates to a vertical ball mill, in particular for pre-grinding material to be ground, such as minerals, to a stator segment for a vertical ball mill, and to method for maintaining a vertical ball mill.

BACKGROUND

In a ball mill, grinding media are used for comminuting material to be ground. In this case, the material to be ground is received in a suspension, which is also referred to as pulp or slurry, and moved in the mill. The grinding media are generally spherical, and are also referred to as grinding balls or grinding pearls. The material to be ground is in particular to be understood to be minerals and mineral aggregates, such as metal ores, but also substances of a hardness similar such as coal ores, recycling materials, etc. In the following description, the comminution of minerals will be described by way of example.

In conventional mills, the minerals are mixed with the grinding balls for the purpose of comminuting the minerals. Some of the grinding balls and the minerals are lifted by a distance specified on the basis of the design, and fall, from this height, back into a bed consisting of the remainder of the grinding balls and minerals. In this case the grinding balls falling down strike resting grinding balls. Minerals located therebetween are smashed.

A conventional ball mill may comprise for example a horizontal drum, i.e. rotating about a horizontal axis, in which minerals are comminuted by means of grinding balls. In the case of an agitator mill gravity is also used as a substantial element for generating comminution forces (known as "gravity induced mills").

In the case of a mill that largely uses gravity, a hydrostatic pressure is established, which assists the grinding. This construction means that the grinding media are lifted repeatedly. Lifting work is required for this purpose, which is provided by a screw conveyor that is to be rotatably driven. The grinding takes place in the ball bed. The essential load results from gravity, and a smaller portion also from centrifugal forces. The portion of the grinding forces that are due to gravity cannot be influenced. The material to be ground is also lifted by the screw conveyor and recirculates downwards, at the periphery. The primary transport of the material to be ground takes place via the screw conveyor, and a certain portion via flow forces in the pulp. Such a grinding or transport mechanism may also cause coarse material to be discharged. This generally requires the use of an external classification circuit.

Devices for comminuting minerals are constructed in numerous embodiments, and may be designated, viewed in simplified terms, as horizontal and vertical mills. A vertically arranged agitator mill comprising subsidiary grinding media for homogenising, dispersing and comminuting solids in fluids is known from DE 1 901 593 (A1). In primary production (mines, etc.), vertically arranged mills have also proven themselves (see inter alia WO 2007/019602 A2).

Alternatively thereto, mills exist in which the comminuting forces are generated primarily in a fluidised grinding bed and may be generated and varied by the rotational speed of a rotor (known as "fluidised mills"). A vertically oriented mineral mill for fine grinding was proposed during the IMCET 2013 ("23rd International Mining Congress and Exhibition of Turkey", Kemer/Antalya/Turkey, Apr. 16-19, 2013, in particular Session 1: "Stirred Milling Technology—A new concept in fine grinding", by I. Roitto et al. "Outotec a fine grinding technology"). The proposed mineral mill for finely comminuting pre-ground minerals consists of a vertically oriented stator that is composed of two half-shells and comprises stationary annular grinding discs, which stator is suspended on a solid platform, and of a rotor that is mounted on one side thereof, on the shaft of which rotor grinding discs are arranged. In addition to the central rotor, which is driven by geared motors, mounted on the platform, at a power of up to 5000 kW, the stator is also suspended on said platform. The heterogeneous mixture comprising water and comprising grinding media is comminuted between the rotating grinding discs and stationary grinding discs fastened to the housing, until the material to be ground has reached the desired grain size and grain distribution. This takes place at a net volume (filling volume) of at most 30 $m^3$. In order that the grinding process may take place at all, the grinding method used in the process (which is sometimes referred to as a HIG process; ultra fine grinding technology) assumes pre-treated minerals comminuted in multiple stages.

SUMMARY

Against this background, by means of the approach proposed here a vertical ball mill, in particular for coarse pre-grinding of minerals, a stator segment for a vertical ball mill, and a method for maintaining a vertical ball mill according to the independent claims are proposed. Advantageous developments and improvements of the approach set out herein will become clear from the description and are described in the dependent claims.

Embodiments of the present invention may advantageously make it possible to reduce the energy input for pre-grinding of minerals and thus achieve an increase in efficiency, as well as to modify a structural design of a mill usable for pre-grinding such that it may inter alia be easily assembled, disassembled and maintained.

In particular, the approach set out herein provides a robust design, the construction of which may be designed so as to be less material-intensive and significantly lighter weight than concepts hitherto. The structure may thus be brought close to the mineral pit or to a use location, partially disassembled, in a relatively simple manner. Required regular maintenance works may be substantially shortened and simplified by means of the approach set out herein. The machine concept makes it possible to reduce a risk of injury. An overhaul of the proposed mill may be relatively simple to perform, such that possibly no specially trained specialist personnel are required. The approach set out herein may furthermore allow for improved process control and facilitated adjustment to the material quality available in the mine. The comminuted material may be further processed or refined, and/or supplied directly to the downstream process.

In the case of overhaul and repairs, in general no additional lifting gear is required for disassembly and assembly. Replacement parts may be stored on-site, in a space-saving manner, at the same height as the components that are mainly to be replaced, such as a mill shaft comprising grinding discs or individual grinding cylinders. Horizontal displacement and positioning of the replacement parts may be performed without danger, by few people, for example by means of rails and rollers. This also includes reliable and quick emptying of the grinding cylinder, without significant material losses.

According to a first aspect of the invention, a vertical ball mill, in particular for pre-grinding material to be ground, such as minerals, is proposed. The vertical ball mill comprises (i) a rotor that is axially and radially mounted at an upper end and hangs downwards, (ii) a stator which radially surrounds the rotor, is not loaded by a weight of the rotor, stands in a self-supporting manner, and has a lateral surface that is oriented tangentially to the rotor and is approximately cylindrical, within a shape tolerance, and (iii) a base plate that supports a weight of the stator. In this case, the stator is composed of at least two stator segments which may be separated from one another, stand unsupported in the separated state, and may be moved relative to one another. Each of the stator segments comprises, on at least one side edge of a wall, a sealing surface for sealing to the other stator segment in each case, and, on a bottom edge, a standing surface which is dimensioned appropriately for the load and is intended for sealing to the base plate. In this case, the mentioned side edge of the wall extends from a top edge of the wall forming the lateral surface, to a bottom edge of the wall. The stator segment weighs with the standing surface, in a standing manner, on the base plate, in a manner orthogonally on a load-bearing surface of the base plate, within an angular tolerance.

Furthermore, according to a second aspect of the invention a stator segment, which stands in a self-supporting manner, for a vertical ball mill according to the approach proposed herein is proposed. This comprises (i) a wall that is approximately in a shape of a cylindrical segment, within a shape tolerance, (ii) at least one sealing surface that is arranged on a side edge of the wall extending from a top edge of the wall to a bottom edge of the wall and is intended for sealing to another stator segment, and (iii) a standing surface that is arranged on the bottom edge and is dimensioned appropriately for the load, and by means of which the stator segment may be erected on a load-bearing surface of a base plate of the ball mill, so as to be orthogonal within an angular tolerance. In this case, a stator that stands in a self-supporting manner and comprises a lateral surface that is formed by the walls and is circular cylindrical, within a shape tolerance, may be composed of a plurality of stator segments, which stator, in an assembled state, may stand in a loading manner on the base plate for supporting a weight of the stator.

Furthermore, according to a third aspect of the invention, a method for maintaining a vertical ball mill, in particular for pre-grinding of material to be ground such as minerals, is proposed. The vertical ball mill may correspond to the above-mentioned ball mill according to an embodiment of the first aspect of the invention, and again comprises a rotor that is axially and radially mounted at an upper end and hangs downwards, a stator which radially surrounds the rotor, is not loaded by a weight of the rotor, stands in a self-supporting manner, and has a lateral surface that is oriented tangentially to the rotor and is approximately cylindrical, within a shape tolerance, and a base plate that supports a weight of the stator. The stator is composed of at least two stator segments which may be separated from one another, stand unsupported in the separated state, and may be moved relative to one another. Each of the stator segments comprises, on at least one side edge of a wall, extending from a top edge of a wall forming the lateral surface to a bottom edge of the wall, a sealing surface for sealing to the other stator segment in each case, and, on the bottom edge, a standing surface which is dimensioned appropriately for the load and is intended for sealing to the base plate. The stator segment weighs with the standing surface, in a standing manner, on the base plate, orthogonally on a load-bearing surface of the base plate, within an angular tolerance. The method comprises at least the following method steps, preferably in the specified sequence: separating the stator into the stator segments, the stator being separated at the sealing surfaces, arranging auxiliary devices under at least one of the stator segments, and lateral shifting of the stator segment and the auxiliary devices, using a shifting device.

The stator segment may be lifted from the base plate, using lifting devices, prior to the arrangement of the auxiliary devices, and deposited on the auxiliary devices using the lifting devices.

Ideas for embodiments of the present invention may be considered, inter alia and without restricting the invention, as being based on the concepts and findings described in the following.

A vertical ball mill may be understood to be a device for comminuting a material to be ground, using grinding media. The material to be ground may for example be pre-crushed stone or minerals from a mine. The stone or the minerals may for example be comminuted and sieved in a crushing machine, a material bed roll mill (high pressure grinding roll), an autogenous mill or a semi-autogenous mill, before being supplied to the vertical ball mill.

The vertical ball mill described herein may be used as a grinding stage of raw material extraction. The material to be ground is supplied to the ball mill in lumps or as a suspension in a fluid carrier medium or transport medium. The carrier medium may be water for example. The material to be ground may comprise a portion of a desired raw material. For example, the material to be ground may comprise an ore portion. A main portion of the material to be ground may be barren, i.e. not comprise the desired raw material. The comminution results in small particles which may be further processed in the subsequent process steps. The portion of the particles comprising the desired raw material may for example be increased in a subsequent concentration step. For example, in the concentration step advantage may be taken of a density difference between particles from the barren material and particles comprising the desired raw material.

The vertical ball mill described herein may have a large filling volume of more than 20 $m^3$. In practice, economical pre-grinding of minerals requires mills having a net volume (filling volume) of from 20 $m^3$ to 150 $m^3$. In order to allow for the large filling volume, the vertical ball mill is dimensioned accordingly, and is therefore large and heavy. The speed of rotation of the grinding discs may be up to 15 m/s. The power of the drive motors may be up to approximately 12,500 kW.

The grinding media may be spherical in shape for example. The grinding media may consist of a low-wear material. In particular, the grinding media may be of a greater hardness than the material to be ground. The grinding media may consist, for example, of a metal material, in particular steel, or ceramic material.

The grinding media, the material to be ground, and the carrier medium, are surrounded by a fluid-tight container. During operation, the container is immovably connected to a substrate. The container may thus be referred to as the stator. The grinding media are caused to move, in the container, by means of a driving element of the ball mill. The driving element may be referred to as the rotor. The grinding media may be moved in the stator on an approximately circular path, without any notable upwards movement and/ or downwards movement. The circular path may extend perpendicularly to a vertical major axis of the ball mill, within an angular tolerance. The angular tolerance may be referred to as the tolerance of position. The angular tolerance may for example be 10° or less, preferably 5° or less, particularly preferably 2° or less.

The material to be ground is ground or comminuted between the grinding media, when grinding media of different speeds strike against one another and/or roll against one another. A speed difference between the grinding media is achieved in that the grinding media in the direct vicinity of the rotor are moved approximately at a movement speed of a surface of the rotor. In contrast, grinding media in the direct vicinity of the stator approximately do not move. Thus, a speed profile of the grinding media forms between the rotor and the stator. The faster grinding media arranged closer to the rotor collide with or rub against the slower grinding media arranged closer to the stator.

The rotor may be aligned with the main axis, within the angular tolerance. The rotor may be rotatable about the major axis. The rotor may be mounted in a cantilever manner. The rotor may then be unsupported at a lower end. However, an additional bearing at the lower end need not be excluded. On account of the dead weight thereof, the rotor may be held in a suspended orientation, i.e. so as to be substantially perpendicular to a substrate.

The stator may be open at the top. The rotor may dip substantially vertically, from above, into the carrier medium comprising the material to be ground and the grinding media. The rotor may be mounted independently of the stator. The stator may be spatially, statically and/or mechanically separated from the rotor or a rotor bearing of the rotor.

The stator comprises an approximately cylindrical lateral surface, within a shape tolerance. In other words, the stator may surround a cylindrical, in particular circular cylindrical, volume. For this purpose, the stator may preferably have a cross-sectional area that is approximately circular, within the shape tolerance, and may therefore be rotationally symmetrical. The stator may possibly also have an oval, triangular, octagonal, n-sided, or generally polygonal, cross-sectional area. The cross-sectional area may remain the same, within a shape tolerance, from a bottom edge of the stator as far as a top edge of the stator. The shape tolerance describes an allowable deviation from a cylindrical shape. The shape tolerance may for example be 10% or less, preferably 5% or less, particularly preferably 2% or less, based on the overall dimensions of the stator. In other words, the stator may be unround, within the shape tolerance.

A lateral surface describes a boundary surface for the grinding media, the carrier medium, and the material to be ground. The lateral surface may be formed by an inner surface of the stator. The lateral surface may be perpendicular or plumb-vertical, within the angular tolerance.

A base plate conducts a weight of the stator, the grinding media, the carrier medium, and the material to be ground, fully or at least to a predominant portion into the foundation, and is designed appropriately for the load. The base plate may be rigidly connected to the foundation. The base plate may comprise a load-bearing surface as an interface to the stator. The load-bearing surface may have a shape that corresponds to the cross-sectional area of the stator, within the shape tolerance. The base plate may be flat at one surface or at two opposing surfaces. The base plate may comprise an insert for reinforcement, in the region of the load-bearing surface. The base plate may consist of a metal material. The base plate may for example be a separate component and rest on the foundation. The base plate may also stand on support feet and be arranged so as to be spaced apart from the foundation. The base plate may alternatively be formed as a specially shaped region of the foundation.

A stator segment may have a substantially arcuate basic shape. A wall of the stator segment forms a sub-region of the lateral surface. The wall may reproduce an angular range of the lateral surface. If the stator comprises two stator segments, the two walls may each reproduce an angular range of 180°. In the case of three stator segments, each wall may reproduce an angular range of 120°. In the case of $n>3$ stator segments, each wall may reproduce an angular range of (360/n°). The stator segments may be divided differently in the peripheral direction.

The wall has a wall thickness that is designed appropriately for the load. In particular, the wall of the stator segment may be structurally designed, i.e. in particular owing to the wall thickness thereof and/or owing to reinforcement measures, to withstand the forces and loads which arise, in the case of the described mill, in particular where the stator segments stand at the bottom.

The wall may be equipped with a protective layer on an inner face, in order to prevent direct contact between the grinding media and the wall. The wall may comprise reinforcing ribs on the outside.

Side edges of the wall may extend perpendicularly to the top edge and/or bottom edge, within the angular tolerance. A sealing surface may be oriented transversely to a tensile direction of connection elements for connecting the stator segments. In the case of a tangential tensile direction, the sealing surface may be oriented radially. In the case of a radial tensile direction, the sealing surface may be oriented tangentially. The standing surface may be oriented transversely to an anticipated load direction. The standing surface may be oriented horizontally, within the angular tolerance. The sealing surface and/or the standing surface may be formed by reinforcing ribs arranged on the edges of the wall.

The stator segments are movable and/or may be lifted from the base plate. Prior to this, a mechanical connection to the base plate may be released. The movability of the stator segments makes it possible for the vertical ball mill to be opened easily. The rotor is easily accessible at the open ball mill, and maintenance work may be carried out easily at the inner faces of the stator segments.

A plurality of vertically mutually spaced, horizontal, annular-segment-shaped ribs may be arranged on an inner face of the walls of the stator segments. The ribs may form inwardly protruding annular surfaces on the assembled stator, which surfaces are referred to herein as brake surfaces. The rotor may comprise a plurality of vertically mutually spaced, horizontal discs, each having an outside annular surface, which are referred to herein as entraining surface. The ribs and discs may be arranged alternately in the vertical direction. An inside diameter of the brake surfaces may be smaller than an outside diameter of the entraining surfaces. The brake surfaces and the entraining surfaces may thus overlap, at least in part, in the horizontal direction. A meandering labyrinth may be formed between the ribs and the discs. The labyrinth increases a flow resistance for the pulp through the ball mill. The ribs may therefore be considered deflection surfaces. The ribs may be oriented perpendicularly to the wall, within the angular tolerance. The discs may be oriented perpendicularly to the rotor shaft, within the angular tolerance. The discs may approximate a circular shape, within the shape tolerance. The discs may also be polygonal. The ribs or the brake surfaces, as well as the walls, may comprise a protective layer in order, for example, to prevent direct contact with the grinding balls. The discs may likewise comprise a protective layer. The protective layer may be replaceable. The ribs, which form a common brake surface on the assembled stator, may be arranged at the same height on the stator segment and be of the same width or height. The ribs and discs may be arranged at uniform spacings. The discs may comprise apertures between the entraining surfaces and the rotor shaft. The entraining surfaces on the rotor generally enlarge a contact surface of the carrier medium, the material to be ground, and the grinding media with the rotor. The carrier medium, the material to be ground, and the grinding media, may be driven in an improved manner by the entraining surfaces. At the discs, a movement speed of a point increases proportionally to a distance of the point from the axis of rotation of the rotor. The entraining surfaces are moved at the highest movement speed at the outside diameter of the rotor. The brake surfaces on the stator enlarge a contact surface of the carrier medium, the material to be ground, and the grinding media with the stator. The carrier medium, the material to be ground, and the grinding media, may be braked or driven in an improved manner by the brake surfaces and entraining surfaces, respectively. During operation, a high speed difference arises between the entraining surfaces and the brake surfaces. As a result, a large speed gradient arises in the carrier medium, material to be ground and the grinding media, which leads to high speed differences between the individual grinding media. The high speed differences result in high impact or frictional forces, and the material to be ground is efficiently comminuted. A main grinding region of the vertical ball mill may be arranged between the entraining surfaces and the brake surfaces.

The stator segments may each comprise stop elements on an outer face, for lifting and moving the relevant stator segment. Stop elements may be fixed points designed especially for striking of the lifting gear. The stop elements may be dimensioned appropriately for the load. The stop elements may be connected to the wall and/or the reinforcing ribs by means of a reinforcing structure. For example, the stop elements may be connected by means of additional ribs. The stop elements may be oversized, for safety purposes. Stop elements may be designed specifically for a type of lifting gear. For example, stop pins may be used for belts, cables and chains and lugs. Stop eyes may be provided for hooks. Stop surfaces may be used for introducing pressure forces of lifting devices.

The stator segments may each comprise stop elements in the region of the bottom edge of the wall, which stop elements are configured in particular for fixing hydraulic jacks. For this purpose, the stop elements may comprise for example substantially horizontally oriented stop surfaces. The stop elements may also have a specific interface geometry. For example, spherical or spherical cap-shaped surfaces on the stop element or lifting device may interact with spheres or spherical caps on the lifting device or stop element, in order to achieve support that is insensitive to the angle.

The stop elements may define corner points of a virtual horizontal polygon, in particular triangle, the geometrical centre point of which is located on a vertical axis through a centre of gravity of the standing stator segment. In the case of a triangle, the geometrical centre point is located on an interface of angle bisectors of the triangle. In the case of a square, the geometrical centre point lies on an interface of the diagonals of the square. A weight distribution between the stop elements may be predetermined by a position of the stop elements. Correspondence of the axis through the centre of gravity and the centre point of the polygon may maximise a tipping stability when lifting a stator segment.

The ball mill may comprise a shifting device for lateral shifting of the mutually separated stator segments, the shifting device comprising movable auxiliary devices which are designed to be arranged between the stop elements and rails arranged on the ground and extending in parallel, when the stator segment is raised, and to be moved along the rails, together with the stator segment, when the stator segment is deposited thereon. The rails may be rigidly connected to the foundation. The auxiliary devices may comprise plain bearings or rolling elements for reducing friction during movement. Rolling elements may be rotatably mounted rollers for example. The rollers may themselves be supported by antifriction or plain bearings. In the case of a plain bearing, the weight of the stator segment is distributed over a large surface, as a result of which low contact pressure may be achieved. The plain bearings may be lubricated by means of a lubrication system. Alternatively or in addition, a material pairing between the plain bearings and the rail may have a low coefficient of friction. For example, the plain bearing may comprise a sliding surface consisting of PTFE, POM or a similar material. The stator segment may be moved, together with the auxiliary devices, using a movement device. The movement device may be arranged between the stator segment and a fixed point, and exert tensile forces and/or compression forces in a movement direction defined by the rails. The movement device may for example comprise at least one Bowden cable, chain hoist, or hydraulic cylinder.

The shifting device may comprise at least one tilt support for supporting a stop element, vertically spaced apart from the standing surface, on at least one of the rails, in order to prevent tilting of the stator segment during lifting and shifting. A tilt support may support the stator segment at a relevant spacing from the ground. For this purpose, the tilt support may connect the rail to the higher stop element, at an oblique angle. The tilt support may be movable, i.e. moved independently of the stator segment, and fastened to the stator segment only when the stator segment is to be moved.

Alternatively, the tilt support may be rigidly connected to the stator segment and remain in place during operation. The tilt support may be connected to a lower stop element by means of a lower connection. The lower connection may prevent lateral evasion of the tilt support. The tilt support may also be used for orienting the vertical flanges. One of the stop elements for lifting the stator segment may be arranged on the tilt support. Two further of the stop elements for raising may then be arranged on the bottom edge of the wall, which stop elements are arranged substantially on a connection line through the centre of gravity of the standing stator segment.

The stator segment may comprise at least one working platform. The working platform may be oriented horizontally on the standing stator segment, within a tolerance of position. The working platform may extend along an outer contour of the stator segment. The lowest working platform may be arranged overhead, on the stator segment. At least standing height may be kept, as a vertical spacing, between higher working platforms. A ladder may be arranged on the tilt support, via which ladder the working platform is accessible. The working platform and the ladder may comprise railings and/or fall protection devices. The stator segment may be easily accessible, for maintenance work, via the working platform. The working platform makes it possible for movable scaffolding to be omitted during maintenance work.

The rails may be recessed into the foundation of the ball mill, and optionally, when not in use, be able to be covered by covering devices. The rails may be cemented in, for example. The rails may be arranged in depressions in the foundation. The covering devices protect the rails against dirt and damage. In particular, a surface of the rails may be protected from damage in this manner. An upwardly oriented surface of the covering device that covers the rails or of one of said rails may be flush with a surface of the foundation. The covering devices may be passable. Surroundings of the vertical ball mill are thus kept accessible.

The ball mill may comprise an emptying device for emptying the ball mill. Since the grinding media remain in the ball mill during operation, the grinding media may be discharged through the emptying device, together with the residue of the carrier medium and the material to be ground, before the stator is opened. The emptying device may be designed for example as a flap or slide in the wall of a stator segment.

The emptying device may comprise an oblique base within the load-bearing surface of the base plate. One of the stator segments may comprise an emptying opening of the emptying device in the region of a bottom point of the oblique base. An obliquely extending base makes it possible for the grinding media to flow away laterally, under the influence of gravity, during emptying. The oblique base comprises a slope from a lowest point to a highest point. The slope may be for example within an angular tolerance between 1° and 5°, preferably between 2° and 3°, particularly preferably 2.5°. The oblique base may be designed as an oblique plane. The oblique base may also be designed as a three-dimensionally shaped surface oriented towards the bottom point. The emptying opening provides a through-opening through the wall. The emptying opening may be designed as a pipe connection. The pipe connection may be designed in a standardised manner for example. The pipe connection may be designed in size DN 150 for example. The emptying opening may comprise a suitable fitting, such as a slide, a flap, a tap or a valve.

One of the stator segments may comprise at least one rinsing opening of the emptying device in the region of a top point of the oblique base. A rinsing fluid, in particular a rinsing liquid, may be conducted through the rinsing opening into the inside of the stator, in order to rinse this out. The rinsing opening may be designed as a pipe connection. The rinsing opening may be designed in a standardised manner for example. The rinsing opening may be designed in size DN 100 for example. The rinsing opening may comprise a suitable fitting, such as a slide, a flap, a tap or a valve. The rinsing opening may be arranged opposite the emptying opening. The emptying of the ball mill may be supported by rinsing. For example, fluid may be introduced through the rinsing opening, which fluid generates a rinsing flow over the oblique base.

The ball mill may comprise a frame that is separate from the stator. Supports of the frame may be supported on the foundation of the ball mill, in a manner laterally spaced from the stator. At least one crossbeam of the frame may interconnect the supports above the stator. A bearing device of the rotor may be supported on the crossbeam. In other words, a frame may be provided for the ball mill which is designed so as to be separate from the stator and does not bear on the stator, the bearing and drive arrangement being retained and supported on a crossbeam of said frame, such that these components do not bear on the stator. The frame may be composed of, in particular screwed together from, steel beams, for example. The frame may be designed as a gantry, under which the stator is arranged. Owing to the frame, the stator may be dismantled without having to change the rotor in the process. The stator segments may be moved laterally away from the rotor, for example for maintenance activities.

The ball mill may comprise a disengagement device for laterally disengaging the rotor that may be decoupled from an upper coupling. The disengagement device may comprise at least one rail and one coupling device. The coupling device may be designed to be connected to the rotor in the region of the coupling, to be lowered onto the rail together with the rotor, and to be moved along the rail together with the rotor. The disengagement device may move the rotor into an accessible position, for maintenance purposes, while the drive remains in place. The rotor may be separated from the drive, at the coupling. The coupling may be screwed together using a plurality of screws for example. A stop element may be coupled to the coupling, in order to lift the disengaged rotor using a crane. The coupling device may be of a geometry that is adjusted to a contour of the rotor, in the region of the coupling. The coupling device may surround the rotor shaft. The coupling device may comprise stop elements for fixing lifting gear. In particular, the stop elements may be designed for fixing hydraulic jacks. The rails may also comprise stop elements for fixing the hydraulic jacks. The disengagement device may in particular comprise two rails which are arranged on either side of the rotor shaft.

The frame may comprise a maintenance cab in the region of the coupling of the rotor. The coupling may be accessible from the maintenance cab. The maintenance cab may be used for protected storage of tools. The maintenance cab may protect the coupling from environmental influences.

It is noted that some of the possible features and advantages of the invention are described herein with reference to various embodiments of the ball mill, the stator segment, or the method for maintaining the ball mill. A person skilled in the art will recognize that the features of the ball mill, the stator segment and the method may be combined, transferred, adapted and/or exchanged in an appropriate manner, in order to arrive at further embodiments of the invention.

BRIEF DESCRIPTION OF THE DRAWINGS

Embodiments of the invention will be described in the following, with reference to the accompanying drawings, neither the drawings nor the description being intended to be interpreted as limiting the invention.

The figures are merely schematic, and not to scale. The same reference signs in the figures denote identical or functionally identical features.

DETAILED DESCRIPTION

Figure 1:
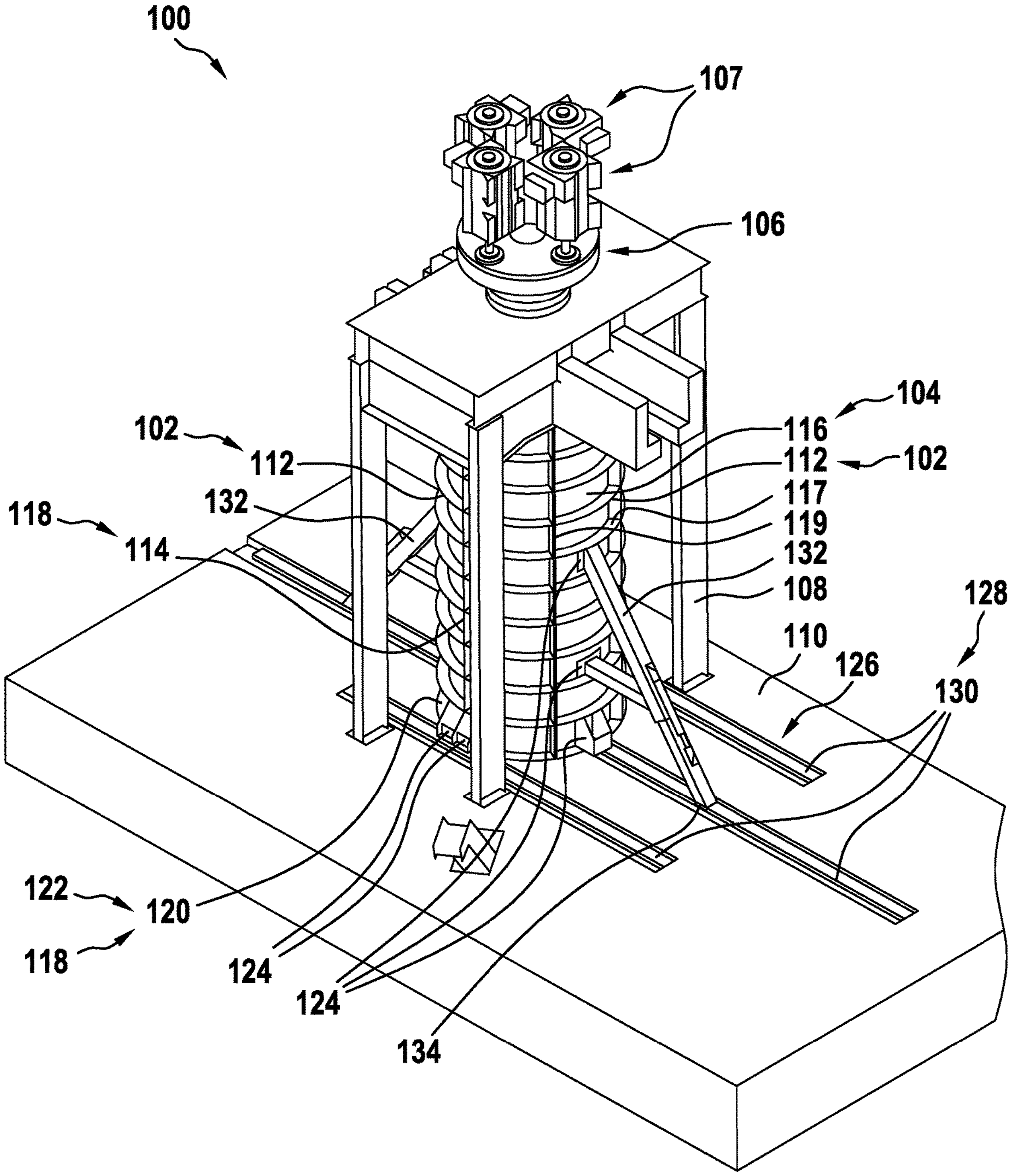
FIG. 1 is a three-dimensional view of a vertical ball mill according to an embodiment.

FIG. 1 is a three-dimensional view of a vertical ball mill 100 according to an embodiment. In the ball mill 100, being very large having a filling volume of over 12 $m^3$ to approximately 150 $m^3$, a suspension of coarsely broken material to be ground may be comminuted in a continuous grinding process, in a fluid carrier medium, by moving grinding media, from an average initial grain size, by approximately a factor of 10 to 100, to an average target grain size. The grinding media may in particular be metal and/or ceramic balls having a diameter that is larger than the initial grain size by approximately a factor of 2 to 50. In this case, the initial grain size may be up to 15 millimetres. In this case, the grinding media may be of a size between 5 millimetres and 50 millimetres. As a result, the ball mill 100 may be used as a comminution stage in a multi-stage development process, for example in raw material extraction. Here, the material to be ground may contain desired minerals and barren stone that is to be separated out.

The ball mill 100 comprises a suspended rotor for moving the grinding media. A free-standing stator 102 radially surrounds a working chamber of the ball mill 100 and the rotor as a container for the suspension and the grinding media. A working chamber in the interior of the stator 102 of the ball mill 100 shown here is of between 12 cubic metres and 150 cubic metres. During operation, the working chamber is largely filled with a grinding media bed consisting of a plurality of grinding media. In this case, the suspension comprising the coarsely broken material to be ground is continuously introduced into the grinding media bed, in a lower region of the working chamber, at a flow rate of between 50 cubic metres per hour and 5000 cubic metres per hour. The material to be ground is comminuted as it flows through the grinding media bed. In an upper region of the working chamber, the suspension, comprising the comminuted material to be ground, flows out of the grinding media bed and is conducted out of the working chamber, while the grinding media remain in the working chamber.

During the grinding process, when the rotor is rotating, a shear flow forms between the stator 102 and the rotor, since a rotor boundary layer between the suspension surrounding the rotor and comprising the grinding media contained therein is substantially carried along at an angular speed of the rotor, and a stator boundary layer of the suspension comprising the grinding media contained therein, at the stator 102, is kept substantially stationary. A speed profile of the shear flow forms between the rotor boundary layer and the stator boundary layer, since the suspension and the grinding media are moved faster, the closer they are to the rotor. Owing to the speed profile, a large number of collisions result, between fast and slow grinding media, in the case of which collisions the material to be ground located therebetween is comminuted. The comminuted material to be ground is washed upwards by an upwards flow of the carrier medium in the working chamber resulting from the flow of the suspension through the grinding media bed.

The stator 102 comprises a lateral surface 104 that substantially approximates a cylindrical shape and covers the rotor, in the view shown in the figure. At an upper end, the rotor is axially and radially mounted above the stator 102, and hangs into the working chamber. A bearing and drive device 106 of the rotor is directly supported on a foundation 110 of the ball mill 100, via a free-standing frame 108. In this case, the bearing and drive device 106 comprises four electric motors 107 having a total output of between 0.8 megawatts and 12.5 megawatts, which electric motors drive the rotor via a common transmission. It is also possible for fewer, to a minimum of one, electric motor(s) to be used. There is no load-bearing contact between the frame 108 and the stator 102. A drive torque of the bearing and drive device 106 is conducted away into the foundation 110 via the frame 108. The stator 102 stands in a self-supporting manner on a base plate of the ball mill 100. The base plate supports a weight of the stator 102, a counter-torque of the drive torque, and a weight of the grinding media, the minerals and the carrier medium on the foundation 110. The base plate is covered by the stator 102 in FIG. 1.

The stator 102 may be divided, in particular for maintenance purposes. In this case, the stator 102 is composed of two substantially identical stator segments 112. The stator 102 may also be composed of more than two stator segments 112. The stator segments 112 are interconnected by means of sealing flanges 114. The sealing flanges 114 extend from a top edge of the stator 102 to a bottom edge of the stator, along side edges of a wall 116 of the stator segments 112. In order to connect the stator segments 112, the sealing flanges 114 may be screwed together for example. In order to separate the stator segments 112, the screws may be loosened again. The adjacent stator segments 112 may alternatively also be releasably mechanically interconnected in another manner. The sealing flanges 114 form sealing surfaces 118 for fluid-tight sealing of the working chamber. Additional seals may be arranged between sealing surfaces 118. The sealing surfaces 118 or seals prevent the suspension from leaking out at the coupling joints of stator 102. Sealing flanges 114 may in addition be provided with leakage channels. Leakage channels may purposely discharge carrier medium, possibly emerging, into a collection system. The wall 116 of a stator segment 112 reproduces a segment of the lateral surface 104 of the stator 102 which is approximately the shape of a cylinder segment, and is reinforced at an outer face by a plurality of tangentially oriented reinforcing ribs 117. In addition, the wall 116 is reinforces on the outer face by some reinforcing ribs 119 extending in the axial direction. The sealing flanges 114 substantially correspond to axial reinforcing ribs 119 that extend along the side edges. The reinforcing ribs 117, 119 reinforce the stator 112 inter alia against a hydrostatic pressure from the carrier medium.

The stator segments 112 each comprise a peripheral standing flange 120 on the bottom edge. The standing flange 120 is essentially a tangential rib extending along the bottom edge of the walls 116. The stator segments 112 are connected to the base plate by means of the standing flanges 120, in particular such that forces resulting from a weight of the stator segments 112, as well as possibly resulting from a weight of the grinding media and the material to be ground may be conducted away into the base plate. For example, the standing flanges 120 may be screwed to the base plate. The standing flanges 120 form a standing surface 122 of the stator 102 that is dimensioned appropriately for the load. The total weight of the stator 102 is supported on the base plate via the standing surface 122. The standing surface 122 is also a sealing surface 118 and seals against the base plate. A seal may likewise be arranged between the standing surface 122 and the base plate. Leakage channels may also be formed between the standing surface 122 and the base plate.

In order to access the rotor, the working chamber may be emptied, i.e. the material to be ground and grinding media may be removed. The stator segments 112 may then be moved laterally. Prior to the movement, a mechanical connection between the stator segments 112, and between the stator segments 112 and the base plate, is released. Subsequently, the stator segments 112 may be individually lifted by means of a lifting device, in order to be moved laterally, free of the base plate. For example hydraulic lifters may be used as a lifting device. For the purpose of lifting, each stator segment 112 comprises a plurality of stop elements 124. The stop elements 124 are arranged in the region of the bottom edge of the wall 116. In this case, the stop elements 124 are designed as brackets that protrude beyond the standing surface 122, and comprise downwardly oriented stop surfaces.

In one embodiment, the ball mill 100 comprises a shifting device 126. The shifting device 126 comprises three movement paths 128 per stator segment 112, via which the stator segment 112 may be moved away from the other stator segment 112, in a laterally guided manner. In this case, the movement paths 128 are specified by rails 130 anchored in the foundation 110. The rails 130 and the foundation 110 are designed to safely bear the weight of a stator segment 112.

For the purpose of shifting, the lifted stator segment 112 is lowered onto auxiliary devices, using the lifting device. The auxiliary devices are arranged between the stop elements 124 and the rails 130, and support the weight of the stator segment 112, lowered thereon, via the rails 130. The auxiliary devices ensure a spacing between the standing surface 122 and the base plate, even in the state when lowered again. The stator segment 112 is moved along the movement path 128 by means of the auxiliary devices.

In one embodiment, the auxiliary devices are designed as sliding blocks which slide on a surface of the rails 130 by means of a sliding lining and an optional lubricant. In order to move the stator segment 112 along the rails 130, traction systems and/or thrust systems may be used.

In an alternative embodiment, in order to shift the stator segment 112 heavy duty castors are arranged between the stop elements 124 and the foundation 110 that is dimensioned appropriately for the load, via which the weight of the stator segment 112 is supported directly on the foundation 110. The stator segment 112 may be moved freely on the heavy duty castors.

In one embodiment, at least one tilt support 132 is arranged on at least one of the stator segments 112. The tilt support 132 may be rigidly fastened to the stator segment 112, or alternatively may be fastened to stop elements 124 of the stator segments 112, provided therefor, prior to the shifting. The tilt support 132 may be supported on the foundation 110 via a heavy duty castor. Alternatively, the tilt support 132 may be part of the shifting device 126. The tilt support 132 is then coupled to one of the rails 130 by means of a further auxiliary device 134. The further auxiliary device 134 may be designed as a sliding block. The further auxiliary device 134 may be secured against being lifted from the rail 130. For this purpose, the auxiliary device 134 may surround the rail 130, at least in part. The auxiliary device 134 may then introduce compression forces and tensile forces into the rail 130. In addition, the tilt support 132 is adjustable in length, in order to be able to compensate the lift when the stator segment 112 is lifted and lowered, or to correct an angular position of the stator segment 112 relative to the other stator segment 112.

In the embodiment shown, the rails 130 are arranged in depressions of the foundation 110. As a result, the rails 130 may be covered during operation of the ball mill 100, as a result of which they are better protected against damage and contamination than if they were exposed.

Figure 2:
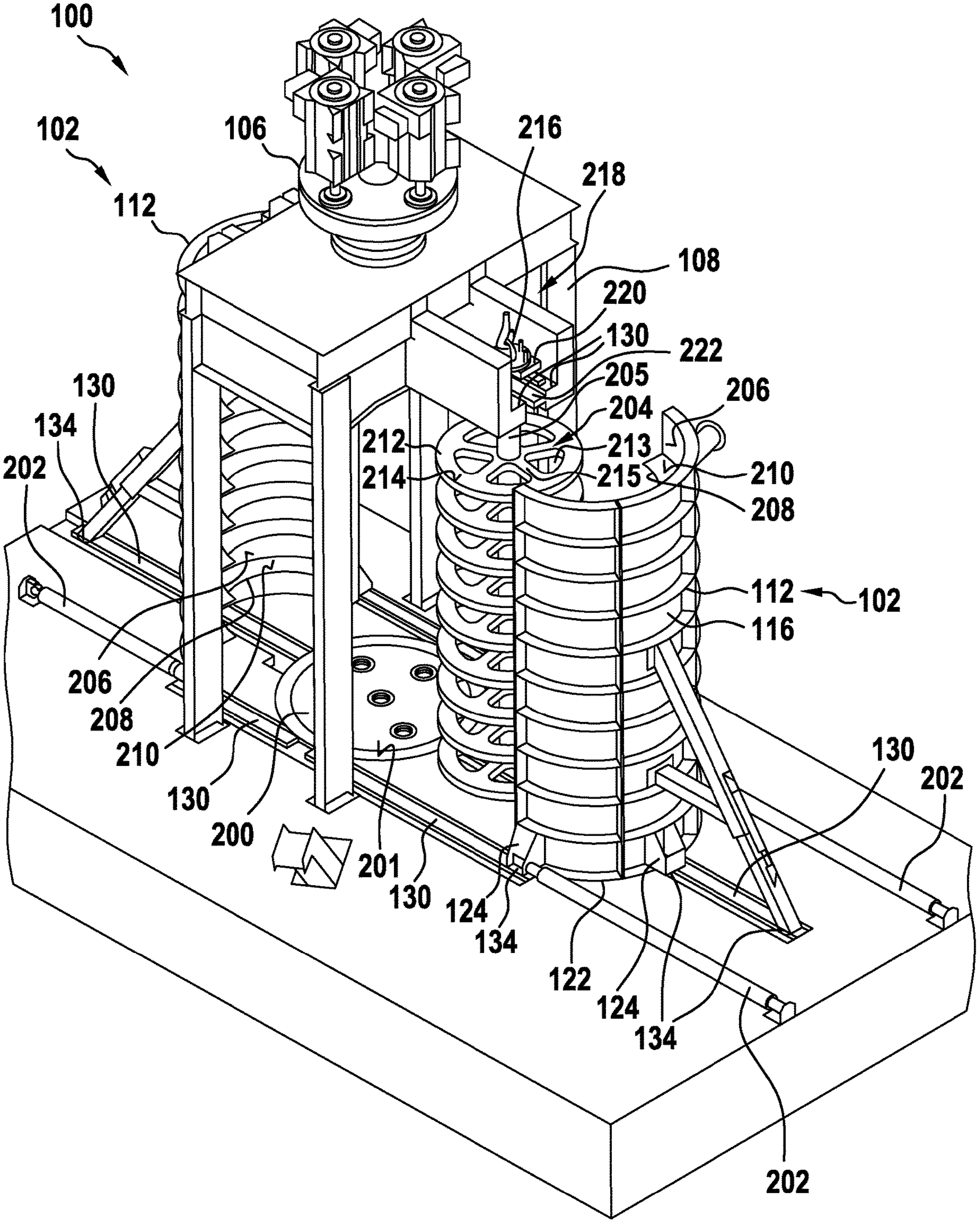
FIG. 2 is a three-dimensional view of an open vertical ball mill according to an embodiment.

FIG. 2 is a three-dimensional view of an opened vertical ball mill 100 according to an embodiment. In this case, the ball mill 100 substantially corresponds to the ball mill in FIG. 1. In contrast to the illustration in FIG. 1, in this case the stator segments 112 have been separated from one another. The stator segments 112 were lifted at the stop elements 124, and in the process lifted from the base plate 200. Auxiliary devices 134 have been arranged between the stop elements 124 and the rails 130, onto which auxiliary devices the stator segments 112 have been deposited. As a result, the standing surfaces 122 are spaced apart from a load-bearing surface 201 of the base plate 200. Using a traction device 202, the stator segments 112 have been shifted laterally, on the auxiliary devices 134, along the movement path 128 defined by the rails 130, in a manner laterally away from the base plate 200, in order to be able to carry out servicing work or maintenance work on the rotor 204 and/or an inner face 206 of the stator 102. In the example shown, the stator segments 112 have been moved in opposite directions.

On the inner faces 206 of the walls 116, the stator segments 112 may comprise a plurality of vertically mutually spaced, horizontal, annular segment-shaped ribs 208. The ribs 208 of both stator segments 112 may be arranged identically. During operation of the vertical ball mill 100, flat sides of each rib 208 function as annular brake surfaces 210 for the suspension. The ribs 208 furthermore function as deflection surfaces, in the direction of the rotor 204, for the suspension flowing from bottom to top, through the ball mill 100. The ribs 208 are uniformly spaced. The ribs 208 on the inner face 206 may, but do not necessarily have to, be of a greater height and/or greater vertical spacing from one another than the tangential reinforcing ribs 117 on the outer face. A design of the mill cylinder without internal ribs is also possible.

The rotor 204 is shown separated from the drive and bearing device 106 and laterally disengaged. The rotor 204 comprises a plurality of discs 212 which are arranged on a rotor shaft 205, are vertically mutually spaced, and are oriented so as to be transverse to the rotor shaft 205. On the flat sides thereof, each disc 212 comprises two annular entraining surfaces 214 for driving the suspension. The discs 212 comprise apertures 213 towards the rotor shaft 205. Spokes 215 are formed through the apertures 213, between the entraining surfaces 214 and the rotor shaft 205.

In the state where the ball mill 100 is ready for operation, the ribs 208 and the discs 212 may be arranged in the working chamber so as to be mutually spaced and alternately one above the other, it being possible for the brake surfaces 210 and the entraining surfaces 214 to overlap, at least in part, in the horizontal direction. As a result of the overlap of the ribs 208 and the discs 212, in the state ready for operation a labyrinth is formed between the stator 102 and the rotor 204, which labyrinth lengthens a flow path of the suspension through the ball mill 100. Likewise, a configuration without the inner ribs 208 is achievable. At an upper end, the rotor 204 comprises a coupling 216, via which the rotor 204 may be releasably coupled to the bearing and drive device 106.

The frame 108 comprises a disengagement device 218 for disengaging the rotor 204. The disengagement device 218 comprises rails 130, which are connected to the frame 108 and protrude laterally beyond crossbeams of the frame 108, and a coupling device 220. The rails 130 are arranged on opposing sides of the rotor shaft 205.

For the purpose of disengagement, the coupling device 220 is connected, in the region of the coupling 216, to the rotor 204 that is coupled to the bearing and drive device 106. The coupling device 220 is substantially U-shaped and is pushed onto the rotor shaft 205 from the side. Subsequently, an open end of the coupling device 220 is closed by a latch 222. The coupling 216 has a greater diameter than the rotor shaft 205. The coupling device 220 is lifted until it rests on the coupling 216 and the bearing and drive device 106 is unloaded, in that a weight of the rotor 204 is captured by the coupling device 220. The coupling 116 is then released from the bearing and drive device 106. The coupling device 220, together with the released rotor 204, is then lowered until it rests on the rails 130. The rotor 204, together with the coupling device 220, is subsequently moved along the rails 130 until the coupling 216 is arranged beside the crossbeam and is accessible from above. The coupling 216 may subsequently be lifted out of the coupling device 220 via an adapter, by means of a crane. The coupling device 220 may comprise a sliding lining for example.

Details of the embodiment as shown in FIG. 1 and FIG. 2 are explained in further, and with sometimes modified wording, in the following.

FIGS. 1 and 2 show a ball mill 100 in which a mill drive, which serves as a bearing and drive device 106 and is composed of motor(s) 107 and a transmission, is arranged, together with a mill shaft that serves as the rotor shaft 205, at the top of the vertical mill, on a platform or a mill frame, which may serve as the frame 108. The mill shaft bears grinding discs 212 and, together therewith, may be referred to as the rotor 204. The platform at the top of the mill bears only the weight of the rotor, motor and transmission, as a result of which relatively small forces act. The forces are in particular small compared with the forces acting when the entire mill is suspended at the top.

A grinding cylinder of the ball mill 100, the grinding cylinder functioning as a stator 102 and comprising an anti-wear lining and stationary discs in the form of ribs 208, is not structurally connected to the mill drive. The grinding cylinder may be divided into two grinding cylinder halves comprising stationary discs. Sealing at the vertical flange and at the radial flange is achieved by means of a hollow joint. A weight of the grinding cylinder, the stationary discs, grinding media, and the suspension, referred to here as the pulp, consisting of material to be ground and carrier medium, is borne by the anchoring on the ground and conducted away into the foundation. The grinding cylinder structure is inherently sufficiently stable to absorb the forces. The base plate 200 is anchored in concrete on the base, for absorbing and conducting away the grinding cylinder forces. An optional wear plate protects the base plate 200 and is retained only by its dead weight, or may also be mechanically fastened and may be easily removed. A pulp inlet is arranged laterally at the bottom, and a pulp outlet is arranged laterally at the top.

During operation of the ball mill 100, the interior space of the grinding cylinder or of the mill cylinder is filled up to 80% of the grinding cylinder height with grinding pearls (not shown). Pulp is located in gaps between the grinding pearls and above the grinding pearl bed. In this case, the ball mill 100 is emptied through openings at the mill base.

The vertical ball mill 100 presented here may be used in particular for primary grinding, i.e. for coarse grinding. In this case, the material to be ground having a maximum grain size F100 of from 10 mm to 15 mm or an F80 of from 250 microns to 5 mm, is ground, in an economical manner, to a fineness of P80 of 100 μm.

A variant of the ball mill 100 may be used for comminution in the fine range. In this case, the fine range refers to grinding to a product fineness having a P80 of from 40 to 300 μm. In the fine range, the supply fineness is preferably in the region of less than 500 μm.

In the case of the vertical ball mill 100 presented here, the grinding media remain substantially in position in the vertical direction. Substantially no lifting work is applied. The grinding takes place in the regions between the rotor discs 212 and the housing discs formed by the ribs 208. The grinding chamber, and thus the loading of the material to be ground with the grinding media, is very well defined. This increases the grinding efficiency. The grinding forces required for the grinding are substantially generated by centrifugal forces. The gravity brings about a contact force or compression, between the grinding media, which increases from top to bottom, and a hydrostatic pressure in the stator 102 that increases from top to bottom. The grinding forces may be influenced and changed by the speed of rotation and by the mass of the grinding media. The material to be ground is transported, in the vertical ball mill 100, by the entraining forces in the pulp, generated by the feed pump. The dwell time, and thus the energy input, may be influenced by an adjustable delivery rate of the feed pump. Finished material is transported through the openings in the rotor, and conducted away upwards, out of the mill, in the overflow. A separate external vision circuit is generally not required. However, if necessary such a circuit may be provided.

The fine material from the vertical ball mill 100 presented herein achieves a narrow grain size distribution (GSD) which is advantageous for the following treatment step (flotation, leaching). This corresponds to a steep progression of a fineness curve shown in an RRRS diagram. A narrow grain size distribution is achieved by minimizing overgrinding. For this purpose, in the approach proposed herein the already finished product is removed from the grinding process as quickly as possible. The better this is achieved, the steeper the GSD is. The grinding chamber of the vertical ball mill 100 is therefore designed such that these prerequisites are achieved. This is substantially achieved by means of openings in the form of the apertures 213 in the rotor discs 212. A pump conveys the pulp from bottom to top, passes the openings and the grinding chamber, and carries the fine fractions of the material to be ground therewith. The speed is determined by the output of the pump. The output is set such that removal of the product ground to the desired product fineness is achieved, and coarser material remains in the grinding chamber of the mill. The material to be ground which has already reached the desired fineness is removed from the grinding chamber as quickly as possible. Overgrinding is thus prevented.

In order to be able to begin maintenance work on the ball mill 100, the grinding cylinder interior is emptied. In this case, the grinding pearls and the pulp are discharged through openings and pipelines in the mill base, and by opening the corresponding valves. The grinding pearls and the pulp leave the grinding chamber, through the base openings, on account of the dead weight. The emptying amount may be controlled by the valves and assisted by rotating the rotor. Pipelines guide the grinding pearls and the pulp to a suitable conveyor system, which is attached below the mill base. The conveyor system may for example be a conveyor belt, a screw-conveyor, a pump, or a bucket conveyor. The list is not final.

The conveyor system transports the grinding pearls and the pulp to the side of the ball mill 100, at a sufficient height in order that a container or lorry may be filled therewith. This procedure is continued until the ball mill 100 is completely emptied.

In order to open the stator 102 by shifting one of the stator segments 112 in the form of the first grinding cylinder half, the slide rails 130 are covered and cleaned. In this case, in particular a slide rail surface is cleaned. Subsequently, mounting supports or tilt supports 132 are mounted on both mill cylinder halves, and tube flange screw connections of the pulp feed and the pulp discharge pipe are released. Then the vertical and radial flange screw connections are released, and three hydraulic cylinders are inserted per grinding cylinder half. Using the three hydraulic cylinders, a grinding cylinder half is lifted by approximately 25 mm, and three Teflon sliding blocks are attached to the grinding cylinder half, and a further sliding block is attached to the mounting support. The grinding cylinder half is lowered by the three hydraulic cylinders, until the Teflon sliding blocks stand on the slide rails. The traction and thrust cylinders on both sides are then connected to the provided tabs of the grinding cylinder or of the sliding blocks. The mounting support is extended, by means of the hydraulic cylinder thereof, until the grinding cylinder half starts to lift. The grinding cylinder half is drawn as far as the provided maintenance position, by means of the two traction and thrust cylinders.

In order to dismantle the mill shaft, a shaft assembly slide or shaft assembly dolly is moved towards the installed shaft, as a release device 218. The shaft assembly slide is lifted upwards by approximately 25 mm by means of four hydraulic cylinders, and the shaft clamp is closed and clamped around the shaft piece. Subsequently, coupling screws are released. The shaft assembly slide is lowered, together with the clamped and decoupled shaft, by means of four hydraulic cylinders, until the shaft assembly slide is deposited on the slideway. By means of at least one hydraulic shifting cylinder, the shaft assembly slide is shifted, together with the shaft, into a lateral position or lifting position, at which the shaft may be shifted by means of the indoor crane. A shaft retention means or an eyelet is installed on the shaft coupling here. The shaft may now be lifted away, on the hook of the indoor crane. The shaft may be mounted in a suspended retention device or deposited on a special maintenance trailer.

Figure 3:
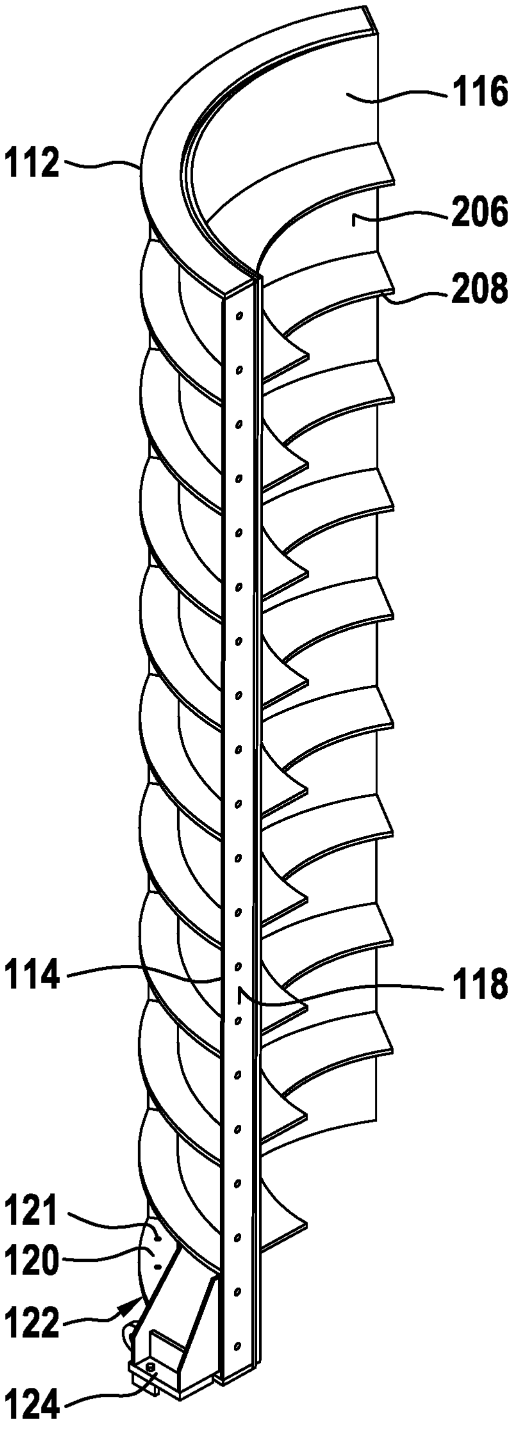
FIG. 3 is a three-dimensional view of a stator segment of a vertical ball mill according to an embodiment.

FIG. 3 is a three-dimensional view of a stator segment 112 of a vertical ball mill according to an embodiment. The stator segment 112 substantially corresponds to one of the stator segments 112 in FIGS. 1 and 2. In contrast to the view in FIGS. 1 and 2, in the embodiment shown the stator is composed of three stator segments 112. The wall 116 reproduces an arc of 120°. The sealing flange 114 and the sealing surface 118, as well as the standing flange 120 and the standing surface 122, are provided with through-holes 121, in order to screw them, in each case, to a correspondingly designed mating part, i.e. another sealing surface of another stator segment 112 or the load-bearing surface of the base plate. The stator segment 112 shown here has a weight of approximately 30 tons. Nine rib segments, arranged at regular distances above one another, are arranged on the inner face 116.

The stop elements 124, designed as brackets, protrude radially beyond the standing surface 122, and are connected to the wall 116 by two axially oriented reinforcing ribs in each case. Two of the stop elements 124 are arranged in the region of the lower corners of the wall 116.

Figure 4:
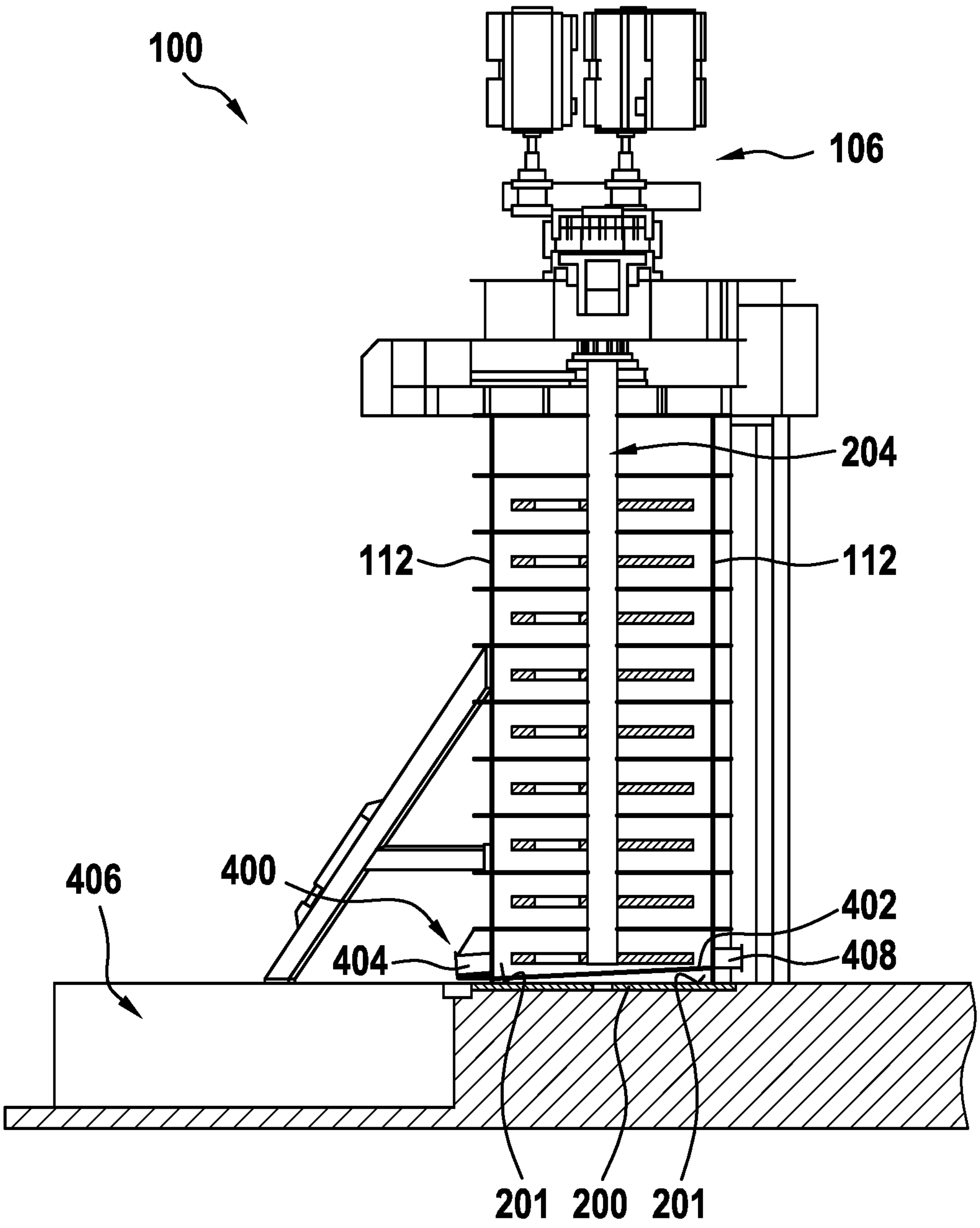
FIG. 4 is a sectional view through a vertical ball mill according to an embodiment.

FIG. 4 is a sectional view through a vertical ball mill 100 according to an embodiment. The ball mill 100 substantially corresponds to the ball mill shown in FIGS. 1 and 2. The ball mill 100 comprises an emptying device 400 for emptying the working chamber. The base plate 200 of the ball mill 100 comprises an oblique base 402 as part of the emptying device 400. For the oblique base 402, a surface surrounded by the load-bearing surface 201 that supports the weight of the stator segments 112 is raised above the surface 201, and oriented obliquely, relative to the horizontal, by an angle of from approximately 2.5° to 30°.

One of the stator segments 112 comprises an emptying opening 404 in the region of a bottom point of the oblique base 402, i.e. where a surface of the oblique base 402 is closest to the load-bearing surface 201. In this case, the emptying opening 404 is designed as a radially oriented pipe connection flange. During operation, the emptying opening 404 is closed by a suitable fitting. For emptying, the fitting is opened. In this case, in addition to the ball mill 100, the foundation 110 comprises a cavity 406 in the region in front of the emptying opening 404, in which cavity transport containers for transporting away the grinding media may be placed for the purpose of emptying the working chamber. The grinding media, together with adhering residue of the suspension, may be discharged, under the effect of gravity, into the transport container arranged in the cavity 406, via the emptying opening 404. During emptying, the rotor 204 may be driven, in order to hurl away grinding media, deposited on the discs 212, towards the outside.

In one embodiment, the other stator segment 112 comprises at least one rinsing opening 408 in the region of a top point of the oblique base 402, i.e. where the surface of the oblique base 402 is furthest from the load-bearing surface 201. In this case too, the rinsing opening 408 is designed as a radially oriented pipe connection flange. The rinsing opening 408 is arranged so as to be diametrically opposite the emptying opening. The rinsing opening 408 may assist the emptying of the working chamber by means of a fluid flow directed to the emptying opening 404. During operation, the rinsing opening 408 is also closed by a suitable fitting.

In addition to the upper radial and axial mounting in the bearing and drive device 106, the rotor 204 may also be mounted in the base plate 200 by means of a floating bearing. For this purpose, the rotor shaft comprises a bearing journal at the lower end, which journal is mounted in the floating bearing. Changes in length of the rotor 204 may be compensated by displacements of the floating bearing on the bearing journal.

Figure 5:
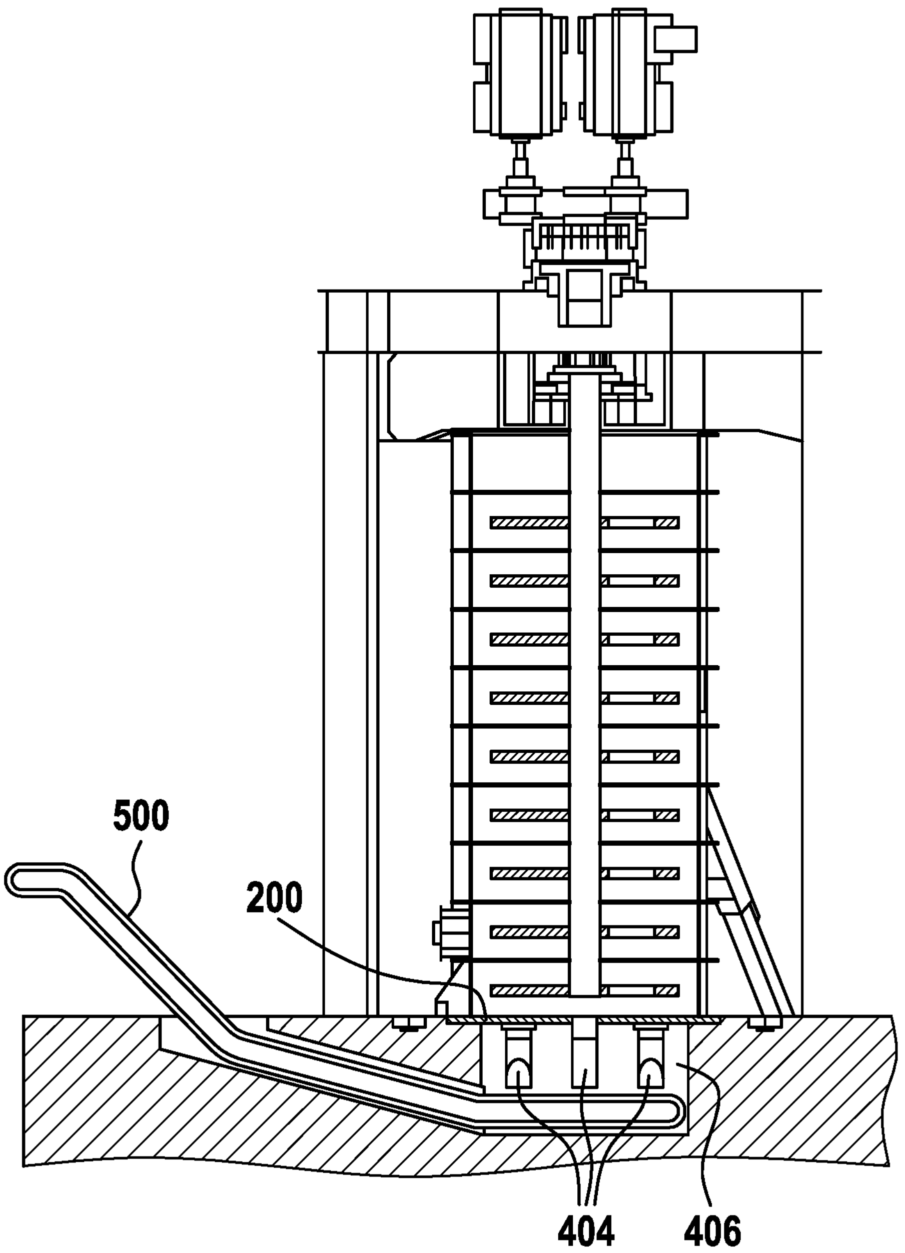
FIG. 5 is a sectional view through a vertical ball mill according to an embodiment.

FIG. 5 is a sectional view through a vertical ball mill 100 according to an embodiment. The ball mill 100 substantially corresponds to the ball mill in FIG. 4. In contrast thereto, in this case the base plate 200 covers the cavity 406, at least in part. In this case, the base plate 200 comprises at least one emptying opening 404. If the fitting is opened, the contents of the working chamber flow away via the emptying opening 404.

In one embodiment, the base plate 200 comprises a plurality of emptying openings 404. The emptying openings 404 are arranged so as to be distributed over the base plate 200. The plurality of emptying openings 404 together have a larger overall cross-sectional area, as a result of which the emptying takes place quickly.

In one embodiment, a transport system 500 for conveying the contents of the working chamber out of the cavity 406 is arranged in the cavity 406. For example, the conveyor system 500 may be designed as a conveyor belt or a screw-conveyor. The transport system 500 has a conveying height which is sufficient for transporting the contents in transport containers that are placed at ground level. Equally, however, the transport container may also be arranged under the mill, such that no conveying device is required.

Figure 6:
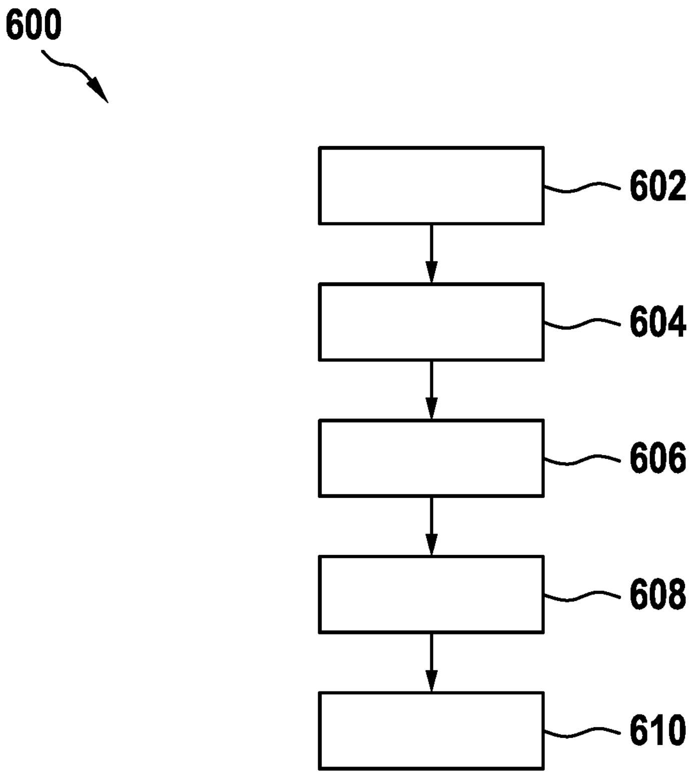
FIG. 6 is a flow diagram of a method for maintaining a vertical ball mill according to an embodiment.

FIG. 6 is a flow diagram of a method 600 for maintaining a vertical ball mill according to an embodiment. Using the method 600, a ball mill which is designed in particular for pre-grinding of minerals may be maintained. The method 600 comprises a step 602 of separation, a step 606 of arranging, and a step 610 of shifting.

The vertical ball mill comprises a rotor that is axially and radially mounted at an upper end and hangs downwards. Furthermore, the vertical ball mill comprises a stator which radially surrounds the rotor, is not loaded by a weight of the rotor, and stands in a self-supporting manner. The rotor comprises a lateral surface that is oriented tangentially to the rotor and is approximately cylindrical, within a shape tolerance. The vertical ball mill furthermore comprises a base plate which supports a weight of the stator. The stator is composed of at least two stator segments which may be separated from one another, stand unsupported in the separated state, and may be moved relative to one another. Each of the stator segments comprises, on at least one side edge of a wall, extending from a top edge of a wall forming the lateral surface to a bottom edge of the wall, a sealing surface for sealing to the other stator segment in each case. Furthermore, each of the stator segments comprises, on a bottom edge, a standing surface which is dimensioned appropriately for the load and is intended for sealing to the base plate. The stator segment bears with a standing surface, in a standing manner, orthogonally on a load-bearing surface of the base plate, within an angular tolerance.

In the step 602 of separation, the stator is separated into the stator segments, the stator being separated at the sealing surfaces. Mechanical connections between adjacent stator segments may be released for this purpose.

In the step 606 of arranging, auxiliary devices are arranged under the stator segment. In this case, the auxiliary devices may be positioned and designed such that the entirety of the stator segment may bear on the auxiliary devices and may be shifted together therewith.

In the step 610 of shifting, the stator segment and the auxiliary devices may be shifted laterally, using a shifting device. In this case, at least one of the stator segments is shifted substantially horizontally, while the weight thereof preferably continues to bear on the foundation of the ball mill, via the auxiliary devices.

The ball mill, comprising the stator that is opened in the manner described, may then be maintained in a simple manner. In particular, the working chamber is easily accessible, such that it may be cleaned and/or wearing parts may be replaced.

In one embodiment, the method 600 comprises a step 604 of lifting and a step 608 of depositing. In the step 604 of lifting, at least one of the stator segments is lifted using lifting devices, the stator segment being lifted from the base plate. Lifting the stator segment by a few millimetres or a few centimetres may be sufficient. The lifting may be achieved in particular using hydraulic lifting devices which support stop elements on the relevant stator segment, from below. In the step 608 of depositing, the stator segment is deposited on the auxiliary devices.

The design of the stator of the ball mill described herein, such that said stator stands in a bearing manner on the base plate and thus indirectly on the foundation, thus makes it possible for the stator to be able to be opened in a simple manner, and preferably also by just a few trained personnel and/or under difficult conditions, in order to then be able to maintain the ball mill. The design described above makes it possible for the maintenance to take place in a shorter time period. Since the mill may then be more quickly used in the production process again, the productivity is increased.

Figure 7:
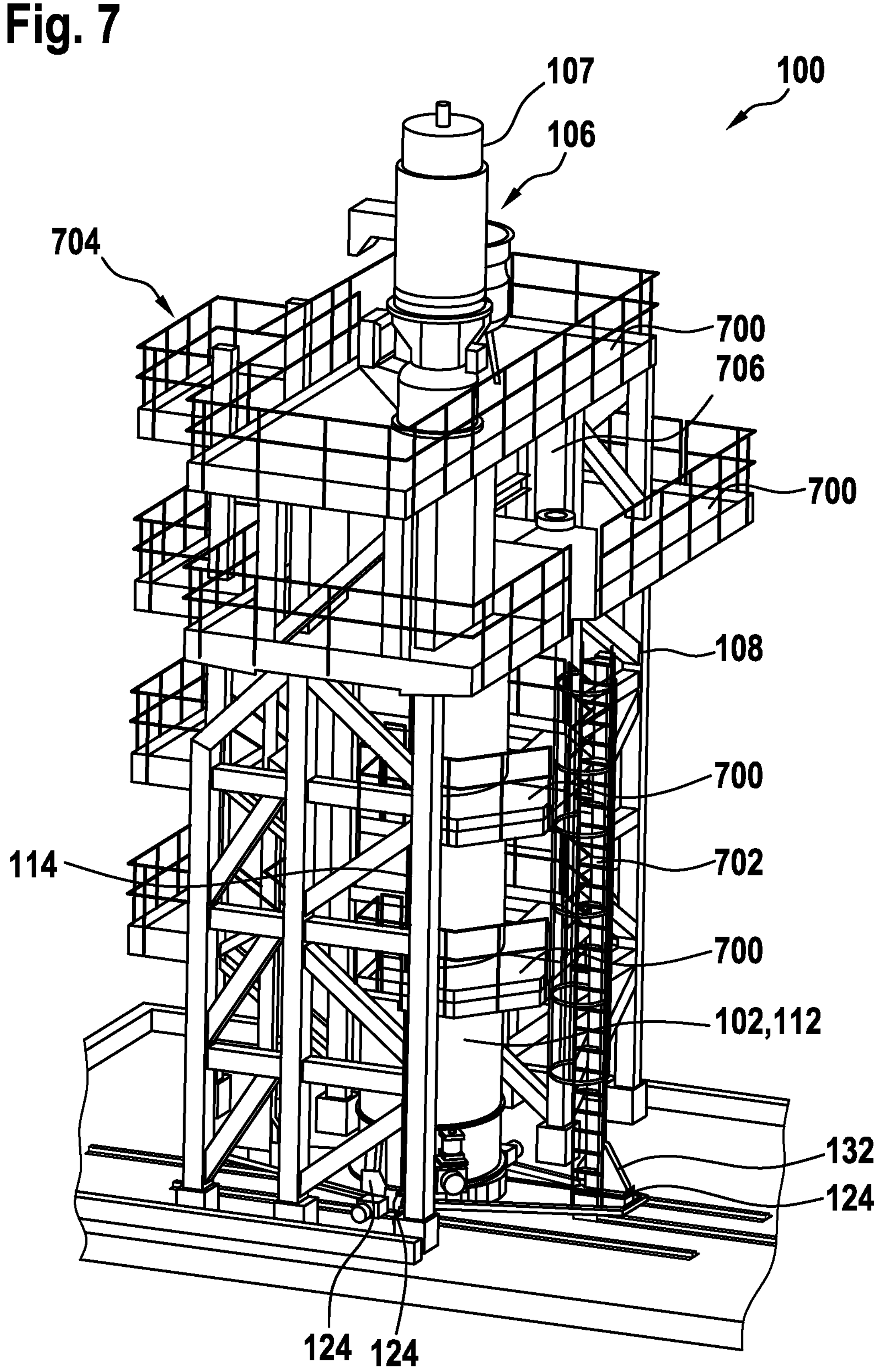
FIG. 7 is a three-dimensional view of a closed vertical ball mill according to an embodiment.

FIG. 7 is a three-dimensional view of a closed vertical ball mill 100 according to an embodiment. In this case, the ball mill 100 substantially corresponds to the ball mill in FIG. 1. In addition thereto, the ball mill 100 comprises working platforms 700 in a plurality of levels one above the other, on the frame 108 and on the stator 102. The working platforms 700 are secured peripherally by means of railings. The stator segments 112 and the frame 108 comprise working platforms 700 in two levels. The frame 108 also comprises working platforms 700 in two levels located thereabove. The ball mill 100 thus extends over four levels.

The working platforms 700 of a stator segment 112 are interconnected by means of a ladder 702. The ladder 702 is fastened to the tilt support 132 which is permanently installed in this case. The ladder 702 comprises a back safety cage. The tilt support 132 is connected to both working platforms 700 or to a support structure of the working platforms 700, and is oriented so as to be substantially in parallel with the longitudinal axis of the stator 102. The tilt support 132 is arranged so as to be spaced apart from the stator segment 112, by the working platforms 700. Owing to the permanently installed tilt support 132, the stator 102 comprises just two stop elements 124 in the region of the sealing flanges 114. The third stop element 124 is arranged on the lower end of the tilt support 132. The sealing flanges 114 are easily accessible, for maintenance work, over the entire length thereof, via the working platforms 700 of the stator 102.

The working platforms 700 on the frame 108 are accessible via a stair tower 704. The stair tower is arranged beside the frame 108. In the third level, the frame 108 comprises a maintenance cab 706 from which protected access to the coupling between the bearing and drive device 106 and the rotor, as well as the disengagement device is possible. The maintenance cab 706 is peripherally surrounded by working platforms 700. The working platform 700 of the fourth level is arranged substantially on a roof surface of the maintenance cab 706 and extends around the bearing and drive device 106. In this case, the bearing and drive device 106 comprises a single electric motor 107.

The frame 108 is designed as a timber-framed construction. In this case, the frame 108 on the side of the stair tower 704 is designed as a three-dimensional framework and comprises six vertical members in two parallel rows. On the lower two levels of the frame 108, working platforms 700 are arranged on the beams of the framework that connect the vertical members. In the closed state of the ball mill 100, the working platforms 700 of the stator are also accessible from the working platforms 700 of the frame 108. On the side opposite the stair tower 704, the frame 108 is designed as a planar framework comprising three vertical members in a row.

Figure 8:
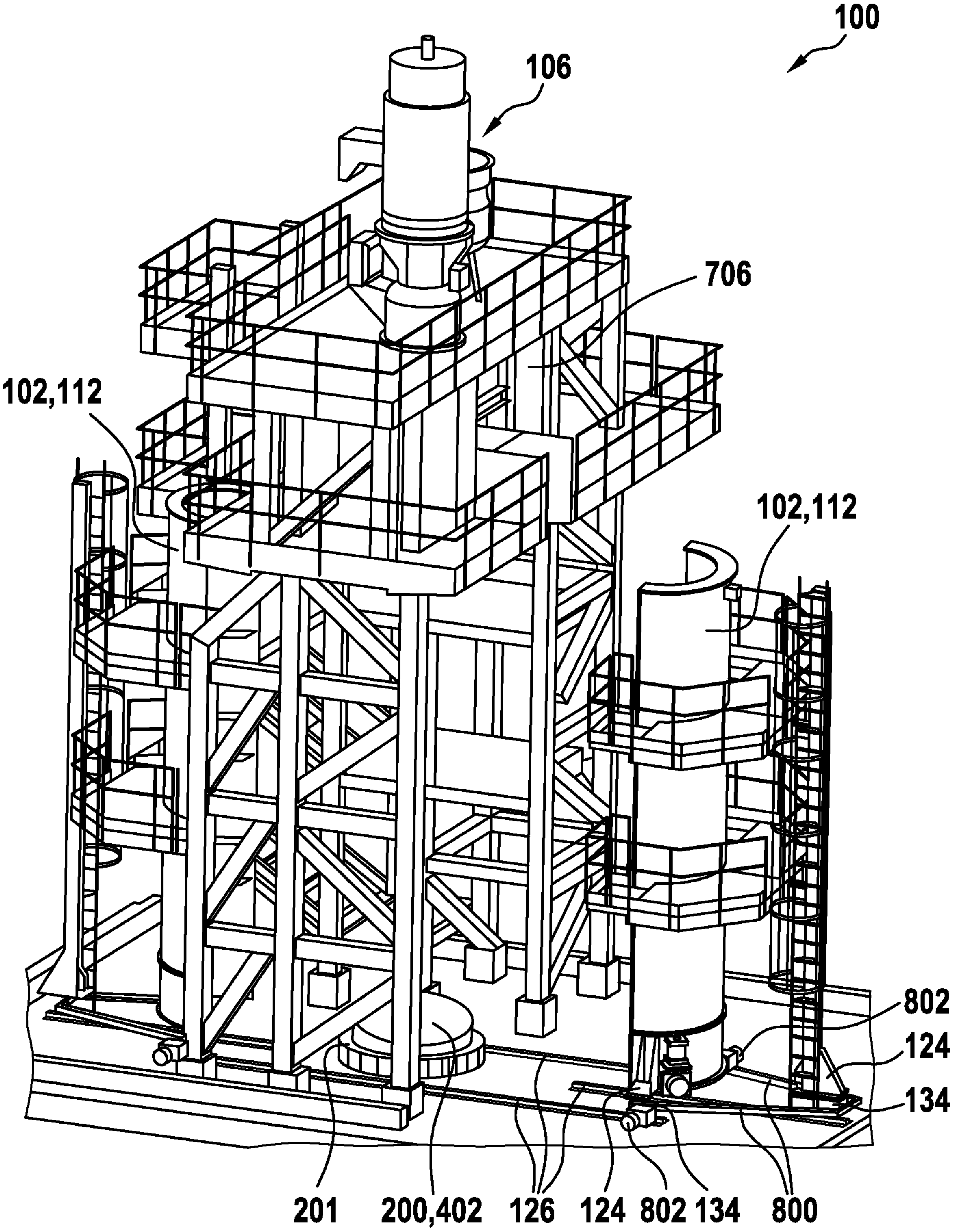
FIG. 8 is a three-dimensional view of an open vertical ball mill according to an embodiment.

FIG. 8 is a three-dimensional view of an opened vertical ball mill 100 according to an embodiment. In this case, the ball mill 100 substantially corresponds to the ball mill in FIG. 7. For reasons of clarity, the rotor is not shown here. In this case, the stator segments 112 are shown separated from one another and shifted laterally. In contrast to the views in FIGS. 1 to 6, in this case the base plate 200 is designed so as to be raised above a surrounding ground surface. The oblique base 402 is designed as an oblique end face of a truncated cylinder that protrudes beyond the load-bearing surface 201, i.e. that protrudes into the interior of the stator 102, when the ball mill 100 is closed.

The auxiliary devices 134 each comprise a frame 800 which connects all three stop elements 124 of a stator segment 112 and fixes the relative positions thereof. Auxiliary devices 134 may be easily raised on the frame 800, for example using the indoor crane, and moved to a storage location. Following the separation of the stator segments 112, the stator segments 112 have been lifted at the stop elements 124, in order to release them from the base plate 200. The auxiliary devices 134, together with the frame 800 thereof, have been arranged between the stop elements 124 and the shifting device 126. The stator segments 112 have then been lowered onto the auxiliary devices 134. The auxiliary devices 134 comprise an own drive 802. Using the drive 802, the auxiliary devices 134, together with the stator segments 112 mounted thereon, have been moved laterally, along the shifting device 126, into the maintenance positions.

Figure 9:
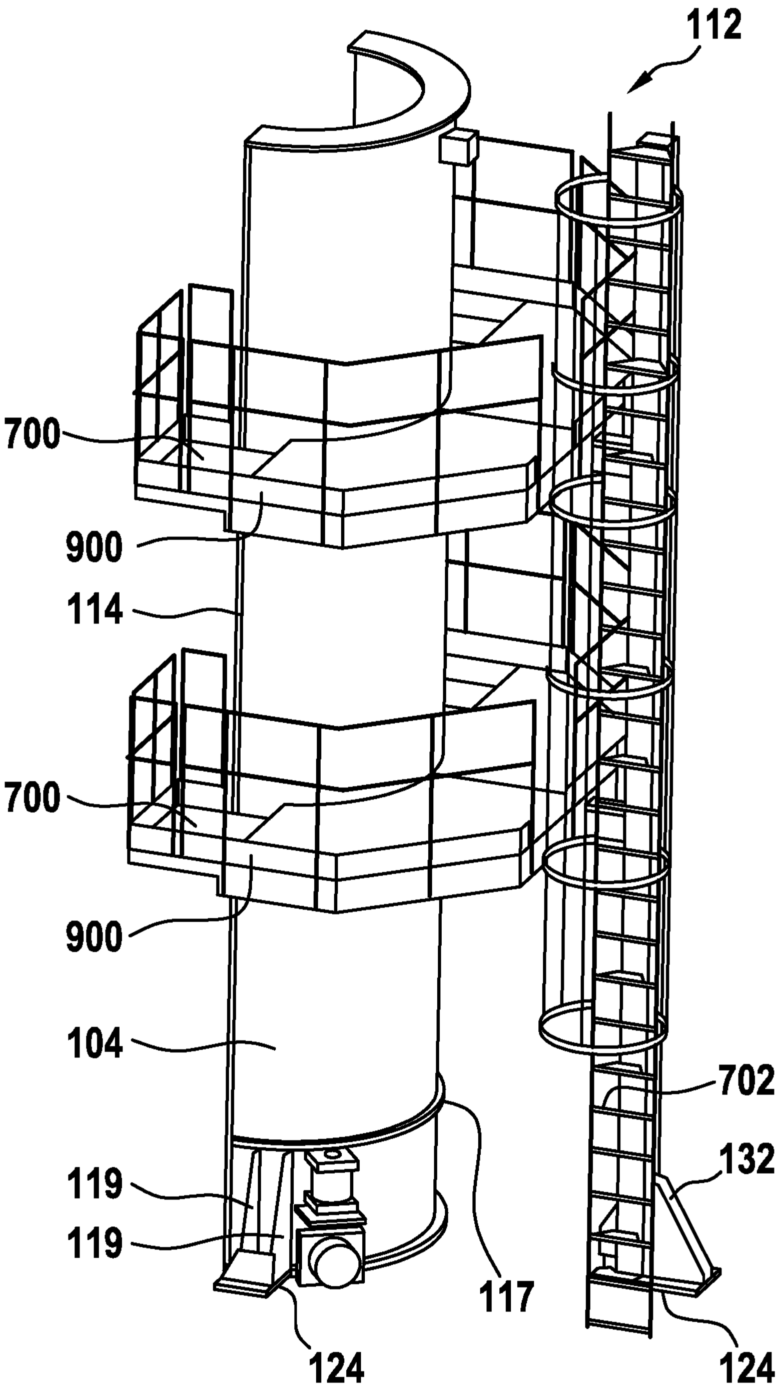
FIG. 9 is a three-dimensional view of a stator segment of a vertical ball mill according to an embodiment.

FIG. 9 is a three-dimensional view of a stator segment 112 of a vertical ball mill according to an embodiment. In this case, the stator segment 112 substantially corresponds to one of the stator segments in FIGS. 7 and 8. In contrast to the stator segments in FIGS. 1 to 5, the stator segment 112 comprises just one reinforcing rib 117 on the outer face. The reinforcing rib 117 is arranged in a lower region of the lateral surface 104, above the axial reinforcing ribs 119 of the stop elements 124.

The working platforms 700 are designed so as to surround the lateral surface 104. On an inner face, i.e. on a side facing the lateral surface 104, the working platforms 700 comprise a semi-circular arc-shaped cutout for the stator segment 112. On an outer face, i.e. on a side remote from the lateral surface 104, the working platforms 700 are angular. The working platforms 700 comprise the railing and a coaming 900 along all the outside edges. The coaming 900 protrudes upwards beyond a ground surface of the working platforms 700, and prevents objects from falling down.

The working platforms 700 comprise a cutout in the region of the sealing flange 114. The sealing flange 114 is thus not interrupted by the working platforms 700. In the region of the cutout, the working platforms 700 are arranged, on a side of the stator segment 112, beyond a plane of the sealing surface 118 or beyond the sealing flange 114. As a result, the sealing flange 114 is accessible from both sides, and the stator segment 112 may be connected, in an ergonomic work position, to the other stator segment (not shown here).

The ladder 702 is arranged on one side of the tilt support 132 and comprises a passage through the back safety cage at the height of the two working platforms 700, in each case. The railing is interrupted in the region of the passages.

Figure 10:
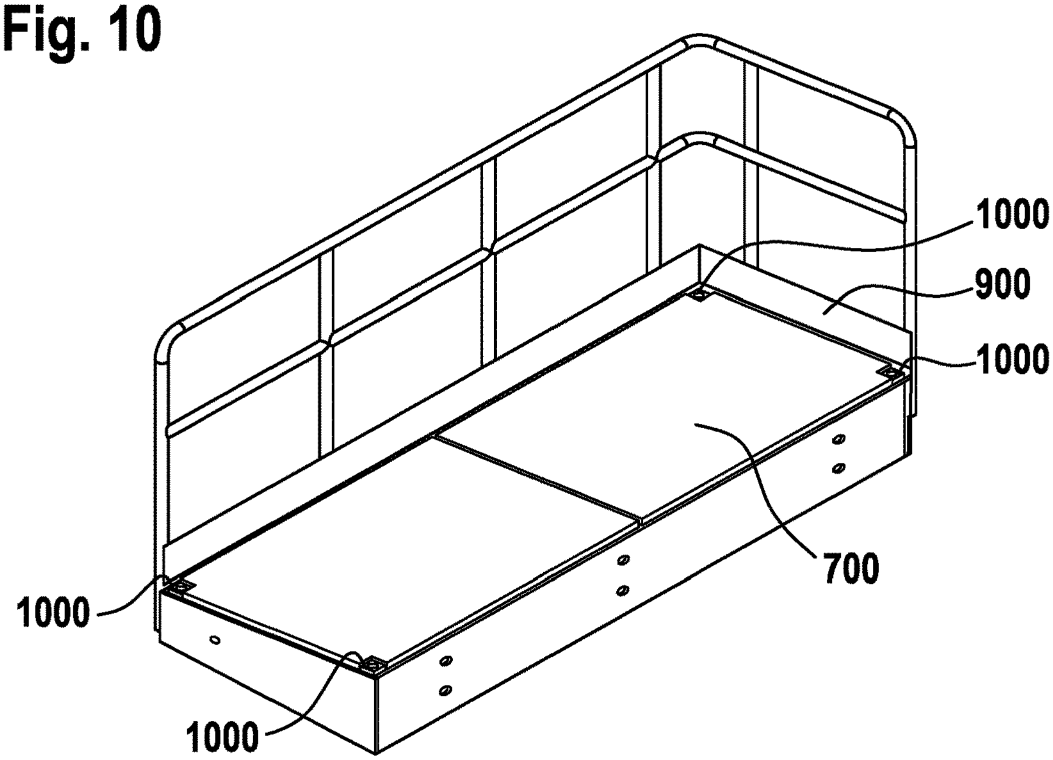
FIG. 10 is a three-dimensional view of a working platform of a vertical ball mill according to an embodiment.

FIG. 10 is a three-dimensional view of a working platform 700 of a vertical ball mill according to an embodiment. In this case, the working platform 700 substantially corresponds to one of the working platforms in FIG. 7. The working platform 700 is rectangular. Just like the working platforms in FIG. 9, the working platform 700 comprises, on two outer faces, a coaming 900 protruding above the ground surface, and a railing. Below the base surface, the working platform 700 comprises a supporting structure. In particular, the base surface is reinforced by ribs. On two inner faces of the working platform 700 the ribs comprise fastening holes for fastening the working platform 700 to the ball mill.

At the four corners, the working platform 700 comprises, in each case, a lifting tab 1000 that is countersunk into a base surface. The working platform 700 may be easily and quickly assembled and dismantled using the indoor crane, via the lifting tabs 1000.

Figure 11:
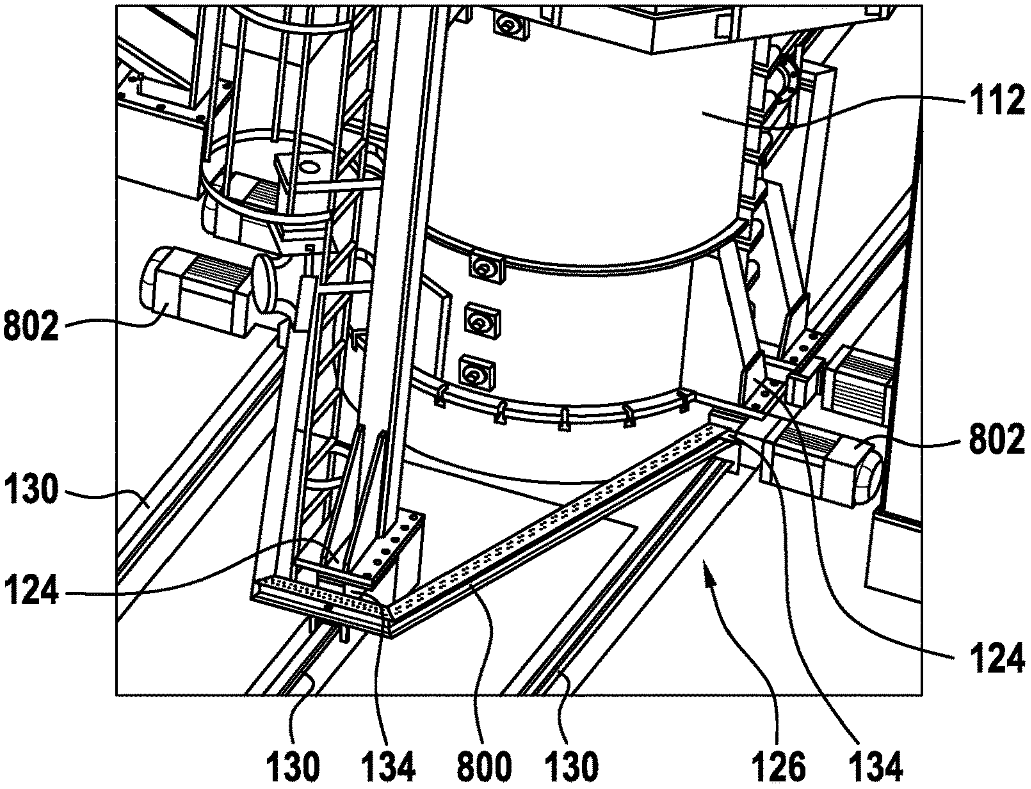
FIG. 11 is a three-dimensional view of a shifting device of a vertical ball mill according to an embodiment.

FIG. 11 is a three-dimensional view of a shifting device 126 of a vertical ball mill 100 according to an embodiment. In this case, the shifting device 126 substantially corresponds to the shifting device in FIG. 8. The shifting device 126 is positioned on the rails 130. The auxiliary devices 134 are arranged between the stop elements 124 and the rails 130. The frame 800 is substantially V-shaped and interconnects the auxiliary devices 134 arranged on the stop elements 124. The two auxiliary devices 134 arranged on the stator segment 112 each comprise an electric drive 802.

Figure 12:
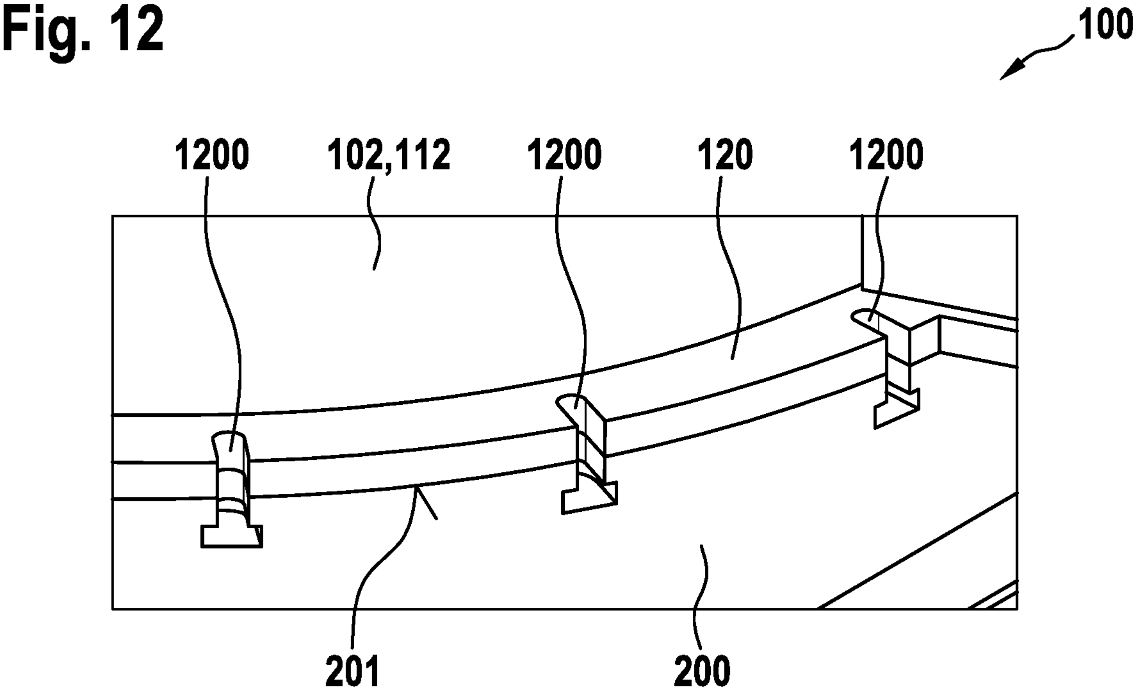
FIG. 12 is a detailed view of a standing flange of a vertical ball mill according to an embodiment.

FIG. 12 is a detailed view of a standing flange 120 of a vertical ball mill 100 according to an embodiment. The standing flange 120 rests on the base plate 200. The base plate 200 corresponds to the view in FIG. 8. The standing flange 120 and the load-bearing surface 201 comprise grooves 1200 that are arranged in a uniform grid. In this case, the grooves 1200 in the load-bearing surface 201 are designed as T-grooves, for receiving T-bolts (not shown here) for screwing the stator 102 to the base plate 200. In the released state, the T-bolts may be laterally removed from the T-grooves and the grooves 1200 of the standing flange 120, and thus do not constitute an obstacle for lateral shifting of the stator segments 112.

Figure 13:
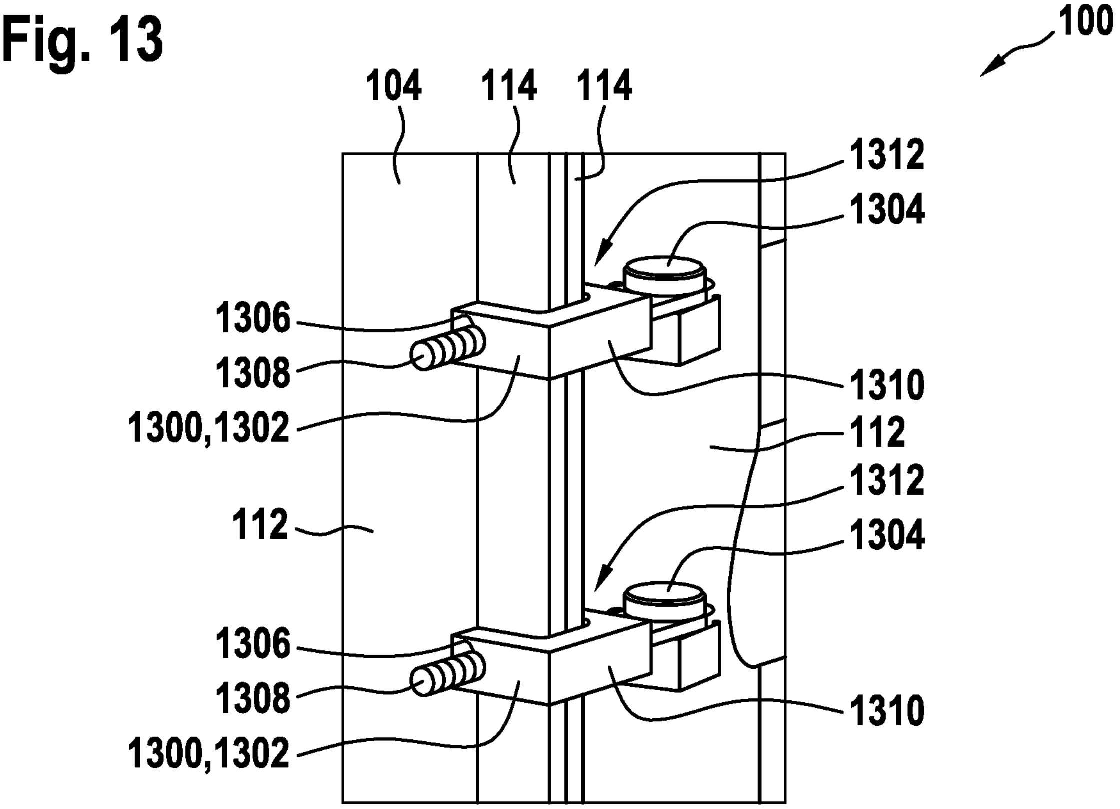
FIG. 13 is a detailed view of a sealing flange of a vertical ball mill according to an embodiment.

FIG. 13 is a detailed view of a sealing flange 114 of a vertical ball mill 100 according to an embodiment. The ball mill 100 is closed in this case. In this case, the sealing flanges 114 of the interconnected stator segments 112 are pressed against one another by means of pivotable clamps 1300. The clamps 1300 comprise a substantially U-shaped base body 1302 and surround both sealing flanges 114 from the outside. On one of the stator segments 112, hinges 1304 are arranged on the outer face, on which hinges the clamps 1300 are mounted so as to be horizontally pivotable. The base bodies 1302 each comprise at least one threaded hole 1306, in which a screw spindle 1308 is rotatably mounted, for pressing together the sealing flanges 114.

In one embodiment, the sealing flanges 114 are interconnected by pivotable clamping jaws 1310. The clamping jaws 1310 are mounted on the hinges 1304 so as to be horizontally pivotable. The clamping jaws 1310 comprise an obliquely tapering, vertical slot 1312. The slot 1312 is wider, at the wider end thereof, than the two sealing flanges 114 together. At the narrower end, the slot 1312 is narrower than the sealing flanges 114. The sealing flanges 114 are introduced into the slot 1312 when the clamping jaws 1310 are pivoted. When the lateral surfaces of the slot 1312 rest on the sealing flanges 114, the clamping jaws 1310 may be wedged on the sealing flanges 114, for example by means of hammer blows. In order to release the clamping jaws 1310, it is possible, for example, for a wedge to be driven between the clamping jaws 1310 and the lateral surface 104, in order to push the clamping jaws 1310 away from the sealing flanges 114.

Finally, it should be noted that terms such as "comprising", "having", etc. do not exclude any other elements or steps, and terms such as "a/an" or "one" do not exclude a plurality. Reference signs in the claims are not to be considered limiting.

LIST OF REFERENCE SIGNS

100 ball mill
102 stator
104 lateral surface
106 bearing and drive device
107 electric motors
108 frame
110 foundation
112 stator segment
114 sealing flange
116 wall
117 tangential reinforcing ribs
118 sealing surface
119 axial reinforcing ribs
120 standing flange
121 through-holes
122 standing surface
124 stop element
126 shifting device
128 movement path
130 rail
132 tilt support
134 auxiliary device
200 base plate
201 load-bearing surface
202 traction device
204 rotor
205 rotor shaft
206 inner face
208 rib
210 brake surface
212 disc
213 apertures
214 entraining surface
215 spokes
216 coupling
218 disengagement device
220 coupling device
222 latch
400 emptying device
402 oblique base
404 emptying opening
406 cavity
408 rinsing opening
500 transport system
600 method for maintaining a vertical ball mill
602 step of separation
604 step of lifting
606 step of arranging
608 step of depositing
610 step of shifting
700 working platform
702 ladder
704 stair tower
706 maintenance cab
800 frame
802 drive
900 coaming
1000 lifting tab
1200 groove
1300 clamp
1302 base body
1304 hinge
1306 threaded hole
1308 screw spindle
1310 clamping jaws
1312 slot

The invention claimed is:

1. A vertical ball mill, comprising:

a rotor that is axially and radially mounted at an upper end and hangs downwards;

a stator which radially surrounds the rotor, is not loaded by a weight of the rotor, stands in a self-supporting manner, and has a lateral surface that is oriented tangentially to the rotor and is approximately cylindrical, within a shape tolerance; and a base plate that supports a weight of the stator, wherein the stator is composed of at least two stator segments which are separable from one another, stand unsupported in the separated state, and are movable relative to one another, wherein each of the stator segments comprises, on at least one side edge of a wall, extending from a top edge of the wall forming the lateral surface to a bottom edge of the wall, a sealing surface for sealing to the other stator segment in each case, and, on the bottom edge, a standing surface which is dimensioned appropriately for a load and is intended for sealing to the base plate, and wherein the stator weighs, in a standing manner, on the base plate with the standing surface, in a manner orthogonal within an angular tolerance on a load-bearing surface of the base plate.

2. The vertical ball mill according to claim 1, in which a plurality of vertically mutually spaced, horizontal, annular segment-shaped ribs are arranged on an inner face of the wall, which ribs form inwardly protruding annular brake surfaces on the assembled stator, and in which the rotor comprises a plurality of vertically mutually spaced, horizontal discs, each having an outside annular entraining surface, wherein the ribs and the discs are arranged alternately in the vertical direction, and the brake surfaces and the entraining surfaces overlap, at least in part, in the horizontal direction.

3. The vertical ball mill according to claim 1, in which the stator segments each comprise stop elements on an outer face, for lifting and moving the relevant stator segment.

4. The vertical ball mill according to claim 3, in which the stator segments each comprise stop elements in the region of the bottom edge of the wall, which stop elements are configured for fixing hydraulic jacks.

5. The vertical ball mill according to claim 3, in which the stop elements define corner points of a virtual horizontal polygon, a geometrical centre point of which is located on a vertical axis that passes through a centre of gravity of the standing stator segment.

6. The vertical ball mill according to claim 3, further comprising a shifting device for lateral shifting of the mutually separated stator segments, wherein the shifting device comprises movable auxiliary devices which are designed to be arranged between the stop elements and rails arranged on the ground and extending in parallel, when the stator segment is raised, and to be moved along the rails, together with the stator segment, when the stator segment is deposited thereon.

7. The vertical ball mill according to claim 6, in which the shifting device comprises at least one tilt support for supporting one of the stop elements, vertically spaced apart from the standing surface, on at least one of the rails, in order to prevent tilting of the stator segment during lifting and shifting.

8. The vertical ball mill according to claim 6, in which the rails are recessed into a foundation of the ball mill.

9. The vertical ball mill according to claim 1, comprising an emptying device for emptying the ball mill.

10. The vertical ball mill according to claim 9, in which the emptying device comprises an oblique base within the load-bearing surface of the base plate, wherein one of the stator segments comprises an emptying opening of the emptying device in the region of a bottom point of the oblique base.

11. The vertical ball mill according to claim 10, in which one of the stator segments comprises a rinsing opening of the emptying device in the region of a top point of the oblique base.

12. The vertical ball mill according to claim 1, comprising a frame that is separated from the stator, wherein supports of the frame are supported on a foundation of the ball mill so as to be laterally spaced apart from the stator, and at least one crossbeam of the frame interconnects the supports above the stator, wherein a bearing-and-drive-device of the rotor is supported on the crossbeam.

13. The vertical ball mill according to claim 12, in which the frame comprises a maintenance cab in the region of the coupling.

14. The vertical ball mill according to claim 1, comprising a disengagement device for laterally disengaging the rotor that is decoupled from an upper coupling, wherein the disengagement device comprises at least one rail and a coupling device, wherein the coupling device is designed to be connected to the rotor in the region of the coupling, to be lowered onto the rail together with the rotor, and to be moved along the rail together with the rotor.

15. The vertical ball mill according to claim 1, wherein the vertical ball mill is configured for pre-grinding minerals to be ground.

16. A self-supporting standing stator segment for a vertical ball mill, comprising:

a wall that is approximately in a shape of a cylinder segment, within a shape tolerance;

at least one sealing surface that is arranged on a side edge of the wall extending from a top edge of the wall to a bottom edge of the wall and is intended for sealing to another stator segment; and a standing surface that is arranged on the bottom edge and is dimensioned appropriately for a load, and by means of which the stator segment is erectable on a load-bearing surface of a base plate of the ball mill, so as to be orthogonal within an angular tolerance, wherein a stator is composed from a plurality of stator segments such that the stator stands in a self-supporting manner and comprises a lateral surface that is formed by the wall and is approximately cylindrical, within a shape tolerance, and wherein the stator, in an assembled state, stands in a loading manner on the base plate for supporting a weight of the stator.

17. A method for maintaining a vertical ball mill, wherein the vertical ball mill comprises a rotor that is axially and radially mounted at an upper end and hangs downwards, a stator which radially surrounds the rotor, is not loaded by a weight of the rotor, stands in a self-supporting manner, and has a lateral surface that is oriented tangentially to the rotor and is approximately cylindrical, within a shape tolerance, and a base plate that supports a weight of the stator, wherein the stator is composed of at least two stator segments which are separable from one another, stand unsupported in the separated state, and are movable relative to one another, wherein each of the stator segments comprises, on at least one side edge of a wall, extending from a top edge of the wall forming the lateral surface to a bottom edge of the wall, a sealing surface for sealing to the other stator segment in each case, and, on the bottom edge, a standing surface which is dimensioned appropriately for a load and is intended for sealing to the base plate, wherein the stator segment weighs, in a standing manner, on the base plate with the standing surface, in a manner orthogonal within an angular tolerance on a load-bearing surface of the base plate, wherein the method comprises:

separating the stator into the stator segments, wherein a stator is separated at the sealing surfaces, arranging auxiliary devices under at least one of the stator segments, and lateral shifting of the stator segment and of the auxiliary devices using a shifting device.

18. The method according to claim 17, in which the stator segment is lifted from the base plate, using lifting devices, and deposited on the auxiliary devices using the lifting devices.

19. The method according to claim 17, wherein the vertical ball mill is configured for pre-grinding minerals to be ground.

* * * * *